US009288277B2

(12) United States Patent
Take et al.

(10) Patent No.: US 9,288,277 B2
(45) Date of Patent: Mar. 15, 2016

(54) COMMUNICATION DEVICE, METHOD FOR COMMUNICATION AND RELAY SYSTEM

(75) Inventors: Yasuo Take, Yokohama (JP); Shigemi Hashimoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 346 days.

(21) Appl. No.: 13/558,840

(22) Filed: Jul. 26, 2012

(65) Prior Publication Data

US 2013/0036228 A1 Feb. 7, 2013

(30) Foreign Application Priority Data

Aug. 1, 2011 (JP) .................................. 2011-168592

(51) Int. Cl.
*H04L 29/08* (2006.01)

(52) U.S. Cl.
CPC ................ *H04L 67/28* (2013.01); *H04L 67/14* (2013.01); *H04L 67/145* (2013.01)

(58) Field of Classification Search
CPC .. H04L 67/145; H04L 29/08612; H04L 67/28
USPC ................................. 709/227; 370/235; 707/2
See application file for complete search history.

(56) References Cited

U.S. PATENT DOCUMENTS

| | | | | |
|---|---|---|---|---|
| 6,587,880 | B1* | 7/2003 | Saigo et al. | 709/225 |
| 7,020,084 | B1* | 3/2006 | Tanaka et al. | 370/235 |
| 7,266,715 | B1* | 9/2007 | Bazzinotti et al. | 714/4.4 |
| 7,657,632 | B2* | 2/2010 | Nakao et al. | 709/227 |
| 8,180,722 | B2* | 5/2012 | John et al. | 706/48 |
| 8,289,968 | B1* | 10/2012 | Zhuang | H04L 61/2517 370/252 |
| 8,433,807 | B2* | 4/2013 | Yang | H04L 69/16 709/227 |
| 8,473,584 | B2* | 6/2013 | Sabiwalsky | 709/218 |
| 2001/0016873 | A1* | 8/2001 | Ohkado et al. | 709/205 |
| 2003/0028649 | A1* | 2/2003 | Uhlik et al. | 709/228 |
| 2003/0187991 | A1* | 10/2003 | Lin et al. | 709/227 |
| 2003/0195864 | A1* | 10/2003 | Vishlitzky et al. | 707/1 |

(Continued)

FOREIGN PATENT DOCUMENTS

| | | |
|---|---|---|
| JP | 2005-184165 | 7/2005 |
| JP | 2005-244964 | 9/2005 |

(Continued)

OTHER PUBLICATIONS

Japanese Office Action dated Jan. 13, 2015 in corresponding Japanese Patent Application No. 2011-168592.

*Primary Examiner* — O. C. Vostal
(74) *Attorney, Agent, or Firm* — Staas & Halsey LLP

(57) ABSTRACT

A communication device is configured to relay a signal between a first device to perform as a connection start terminal and a second device to perform as a connection end device, the communication device including: a processor configured to execute a procedure, the procedure including: establishing, with the second device, sessions meaning logical connections in communication; deciding whether an unused session remains in the established sessions for a command to be transferred to the second device, the command being generated by the first device; in a case of identifying that the unused session remains in the established sessions when the command is received, exchanging the command with the second device by using the unused session; and communicating messages to the second device by using the established sessions within a particular period of time of the second device, the established sessions being continuously maintained in the particular period of time.

7 Claims, 18 Drawing Sheets

(56) References Cited

U.S. PATENT DOCUMENTS

| | | | |
|---|---|---|---|
| 2004/0215787 A1* | 10/2004 | Gibson et al. | 709/227 |
| 2004/0243712 A1* | 12/2004 | Sakai et al. | 709/227 |
| 2005/0002405 A1* | 1/2005 | Gao | 370/401 |
| 2005/0138626 A1 | 6/2005 | Nagami et al. | |
| 2006/0020707 A1 | 1/2006 | Undery et al. | |
| 2006/0123122 A1* | 6/2006 | Jung et al. | 709/227 |
| 2007/0268896 A1* | 11/2007 | Oyama et al. | 370/389 |
| 2007/0280289 A1* | 12/2007 | Konda | 370/468 |
| 2008/0034057 A1* | 2/2008 | Kumar et al. | 709/217 |
| 2008/0104046 A1* | 5/2008 | Singla | G06F 17/30333 |
| 2009/0049180 A1* | 2/2009 | El et al. | 709/227 |
| 2009/0222405 A1* | 9/2009 | Cara et al. | 707/2 |
| 2009/0232130 A1 | 9/2009 | Philavong | |
| 2010/0268831 A1* | 10/2010 | Scott et al. | 709/228 |
| 2011/0119404 A1* | 5/2011 | Maes | 709/249 |
| 2011/0246595 A1 | 10/2011 | Undery et al. | |
| 2011/0271337 A1* | 11/2011 | Chan et al. | 726/7 |
| 2012/0287844 A1* | 11/2012 | Ophir et al. | 370/315 |
| 2012/0303762 A1* | 11/2012 | Geiser | 709/219 |
| 2013/0191311 A1* | 7/2013 | Lyle et al. | 706/12 |

FOREIGN PATENT DOCUMENTS

| | | |
|---|---|---|
| JP | 2005-529398 | 9/2005 |
| JP | 2006-20301 | 1/2006 |
| JP | 2008-211343 | 9/2008 |
| JP | 2009-217445 | 9/2009 |
| JP | 2009-219076 | 9/2009 |
| JP | 2010-44657 | 2/2010 |
| WO | 03/104971 A1 | 12/2003 |

* cited by examiner

COMMUNICATION DEVICE, METHOD FOR COMMUNICATION AND RELAY SYSTEM

CROSS-REFERENCE TO RELATED APPLICATION

This application is based upon and claims the benefit of priority of the prior Japanese Patent Application No. 2011-168592, filed on Aug. 1, 2011, the entire contents of which are incorporated herein by reference.

FIELD

The embodiments discussed herein are related to a communication device, a method for communication and a relay system.

BACKGROUND

It is desirable for some types of communication performed between devices on a network to establish a session before starting the communication. Such a type of communication for which an advance session establishment is desirable is, e.g., telnet for remote control of another device on the network. The term session means a process between a start and an end of a logical connection in the communication performed on the network.

Technologies of session management for using sessions effectively are known, as the number of sessions simultaneously established among devices on the network is limited. One of such technologies is, e.g., to close unused one of established sessions so as to use sessions of a limited number effectively.

Another one of such technologies is to close sessions except for an emergency call made in a case where the number of established sessions has reached the upper limit, and to establish a new session to be allotted to the emergency call. Still another one of such technologies is to watch duration of each of established sessions and to close a session whose duration is over a particular period of time so as to use sessions of a limited number effectively.

Yet another one of such technologies is, in a case where a device that a session is to be established with conceivably demands a longer period of time than a particular time length for making a reply in communication, to limit a session to be established with that device so as to use sessions of a limited number effectively. Further, a technology related to a communication device is to close a session in use according to a timeout condition in an http (Hypertext transfer Protocol) protocol so as to use sessions of a limited number effectively. Another technology related to a communication device is to send a heartbeat message and to maintain a session having been established with that communication device in order to keep the session in use from being closed according to a timeout condition.

Japanese Laid-open Patent Publications Nos. 2005-244964, 2009-219076, 2009-217445, 2005-184165 and 2006-20301 discuss the related art.

SUMMARY

According to an aspect of the embodiment, there is provided a communication device configured to relay a signal between a first device to perform as a connection start terminal and a second device to perform as a connection end device, the communication device including: a processor configured to execute a procedure, the procedure including: establishing, with the second device, sessions meaning logical connections in communication; deciding whether an unused session remains in the established sessions for a command to be transferred to the second device, the command being generated by the first device; in a case of identifying that the unused session remains in the established sessions when the command is received, exchanging the command with the second device by using the unused session; and communicating messages to the second device by using the established sessions within a particular period of time of the second device, the established sessions being continuously maintained in the particular period of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to the technologies related to a communication device, a new session to be established is established after a session having been established is closed. Thus, the device is loaded with a significant data processing workload so as to close and establish sessions and it takes time to establish the new session in some cases.

Hereinafter, embodiments of a communication device, a method for communication and a relay system disclosed in the application will be explained in detail. Incidentally, the disclosed art is not limited by the embodiments.

First Embodiment

Figure 1:
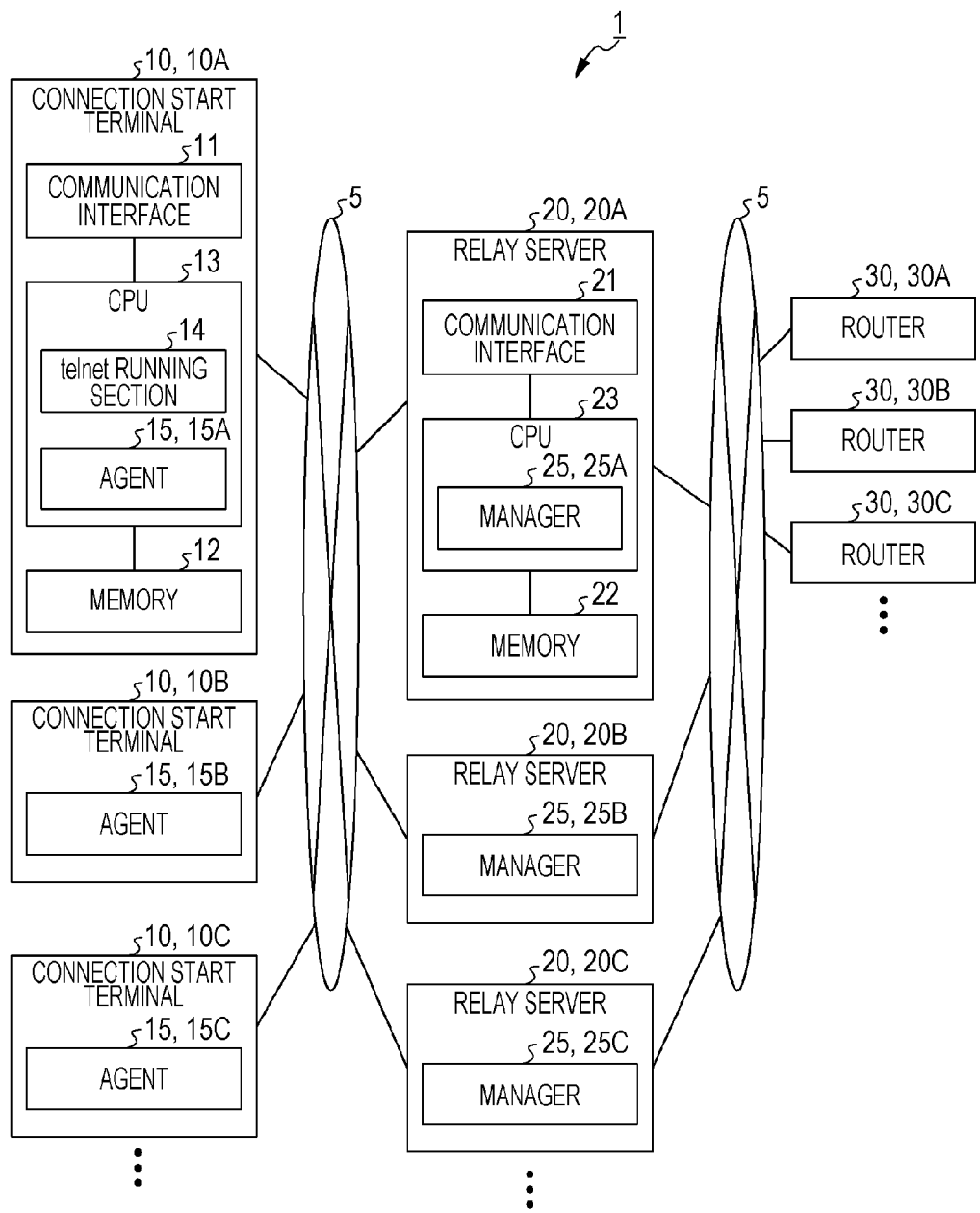
FIG. 1 is a block diagram of an exemplary constitution of a relay system of a first embodiment.

FIG. 1 is a block diagram of an exemplary constitution of a relay system of a first embodiment. The relay system 1 depicted in FIG. 1 has a plurality of connection start terminals 10, a plurality of relay servers 20 and a plurality of routers 30. The plural connection start terminals 10, relay servers 20 and routers 30 are connected with one another via a network 5.

The connection start terminal 10 is a connection start device having a communication interface 11, a memory 12 and a CPU (Central Processing Unit) 13. The communication interface 11 is an interface which controls communication performed between the connection start terminal 10 and the relay server 20. Various kinds of data including various kinds of programs are stored in the memory 12. The CPU 13 entirely controls the connection start terminal 10, and runs various kinds of control operations on the basis, e.g., of the various kinds of programs stored in the memory 12 as well. The connection start terminal may be described as a first device.

The CPU 13 includes a telnet running section 14 and an agent 15 as software functions. The telnet running section 14 runs a command, e.g., of an application related to the telnet protocol. The agent 15 watches communication, e.g., between the telnet running section 14 and the relay server 20.

The relay server 20 is a communication device having a communication interface 21, a memory 22 and a CPU 23. The communication interface 21 is an interface which controls communication performed by the relay server 20 with the connection start terminal 10 and with the router 30. Various kinds of data including various kinds of programs are stored in the memory 22. The CPU 23 entirely controls the relay server 20, and runs various kinds of control operations on the basis, e.g., of the various kinds of programs stored in the memory 22 as well. The CPU 23 includes a manager 25 as a software function which watches communication between the connection start terminal 10 and the relay server 20, and between the relay server 20 and the router 30. The router 30 is a connection end device. The connection end device may be described as a second device, and the relay server may be described as a third device.

Incidentally, suppose for convenience of explanation that the connection start terminals 10 of the relay system 1 each have the agent 15, i.e., connection start terminals 10A, 10B and 10C have agents 15A, 15B and 15C, respectively. Further, the relay servers 20 of the relay system 1 each have the manager 25, i.e., relay servers 20A, 20B and 20C have managers 25A, 25B and 25C, respectively. Further, the relay system 1 has the respective routers 30 (30A, 30B, 30C and so forth).

Figure 2:
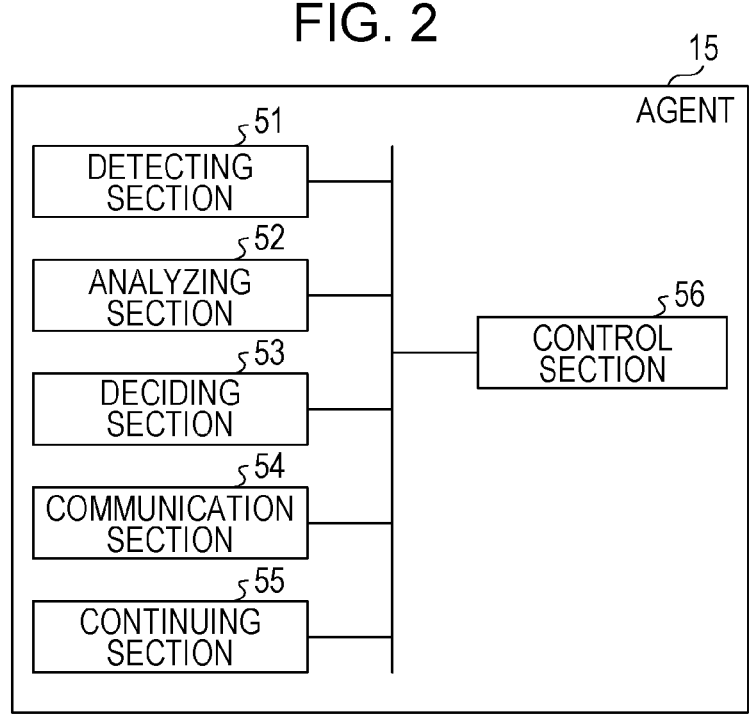
FIG. 2 is a block diagram which depicts an exemplary function of an agent that a connection start terminal has.

FIG. 2 is a block diagram which depicts an exemplary function of the agent 15 that the connection start terminal 10 has. The agent 15 depicted in FIG. 2 has a detecting section 51, an analyzing section 52, a deciding section 53, a communication section 54, a continuing section 55 and a control section 56. The detecting section 51 detects a command of the telnet application run by the telnet running section 14.

The analyzing section 52 analyzes an address of a destination device that the command detected by the detecting section 51 is sent to. The analyzing section 52 divides a session between the applicable connection start terminal 10 and the destination device of the command (router 30) into sessions between the connection start terminal 10 and the relay server 20 and between the relay server 20 and the router 30 on the basis of the analysis.

The deciding section 53 refers to content of a management table in the manager 25 described later and analyzes states of use of sessions with the relay server 20 after being divided by the analyzing section 52. The deciding section 53 decides, e.g., whether a session established with the relay server 20 remains in an "unused" state of use. Incidentally, the "unused" state of use means a state of an established session on which a reply to commanded data transmission is completed, i.e., a reply to the command is completed.

If the deciding section 53 identifies no session established with the relay server 20 remaining in an "unused" state of use, the communication section 54 establishes a new session with the relay server 20. Meanwhile, if the deciding section 53 identifies a session established with the relay server 20 remaining in an "unused" state of use, the communication section 54 uses the session being "unused" without establishing a new session. If a session remaining in an "unused" state of use is identified, the communication section 54 sends information on session establishment indicating a session at an end of the relay between the relay server 20 and the router 30 to the relay server 20 by using the established session.

Upon receiving a reply of successful session establishment from the relay server 20, the communication section 54 carries out command communication, i.e., data transmission and reply to data transmission by using the established session. Incidentally, the reply of successful session establishment is a message indicating that a session is established between the connection start terminal 10 and the router 30 being a connection end terminal, i.e., sessions are established between the connection start terminal 10 and the relay server 20 and between the relay server 20 and the router 30.

Further, the continuing section 55 sends a heartbeat message to the relay server 20 so as to maintain a session established with the relay server 20. Incidentally, it is desirable to send a heartbeat message at intervals shorter than timeout time that the router 30 which receives the heartbeat message waits for before automatically closing the established session. The heartbeat message is, e.g., a blank message formed by single-byte spaces so as to reduce a workload of message processing that the router 30, i.e., the connection end device is loaded with. Upon receiving a heartbeat message from the relay server 20 before the timeout time passes, the router 30, i.e., the connection end device resets, e.g., a counter which counts the timeout time. As resetting the counter which counts the timeout time each time receiving a heartbeat message, the router 30 consequently maintains the session established with the connection start terminal 10 via the relay server 20.

Further, after establishing a session with the manager 25 in the relay server 20, the communication section 54 sets one round of data transmission to be performed by the use of the established session, e.g., at two-second intervals. The router 30, i.e., the connection end thereby reduces a workload of reply to data transmission in this way. Incidentally, the control section 56 entirely controls the agent 15.

Figure 3:
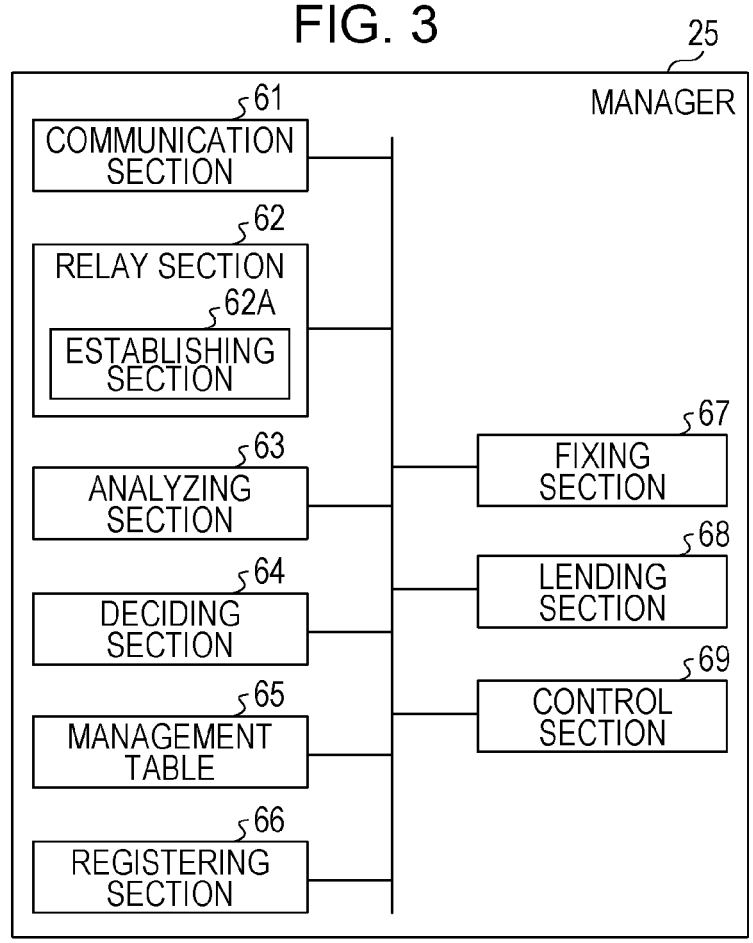
FIG. 3 is a block diagram which depicts an exemplary function of a manager that a relay server has.

FIG. 3 is a block diagram which depicts an exemplary function of the manager 25 that the relay server 20 has. The manager 25 depicted in FIG. 3 has a communication section 61, a relay section 62, an analyzing section 63, a deciding section 64, a management table 65, a registering section 66, a fixing section 67, a lending section 68 and a control section 69.

The communication section 61 controls communication, e.g., with the router 30 which performs as a connection end device, with another relay server 20 connected with the router 30 and with the connection start terminal 10. The relay section 62 relays communication between the connection start terminal 10 and the router 30. The analyzing section 63 analyzes a command and information on session establishment coming from the connection start terminal 10. Then, the analyzing section 63 identifies sessions between the connection start terminal 10 and the relay server 20 and between the relay server 20 and the router 30 on the basis of a resultant analysis.

The relay section 62 has an establishing section 62A. The establishing section 62A establishes a session between the connection start terminal 10 and the router 30 that is formed by sessions between the connection start terminal 10 and the relay server 20 and between the relay server 20 and the router 30 identified by the analyzing section 63. Then, the relay section 62 notifies the agent 15 of the connection start terminal 10 of a reply of successful session establishment. The management table 65 is used for managing a state of use of a session established between the connection start terminal 10 and the router 30.

Figure 4:
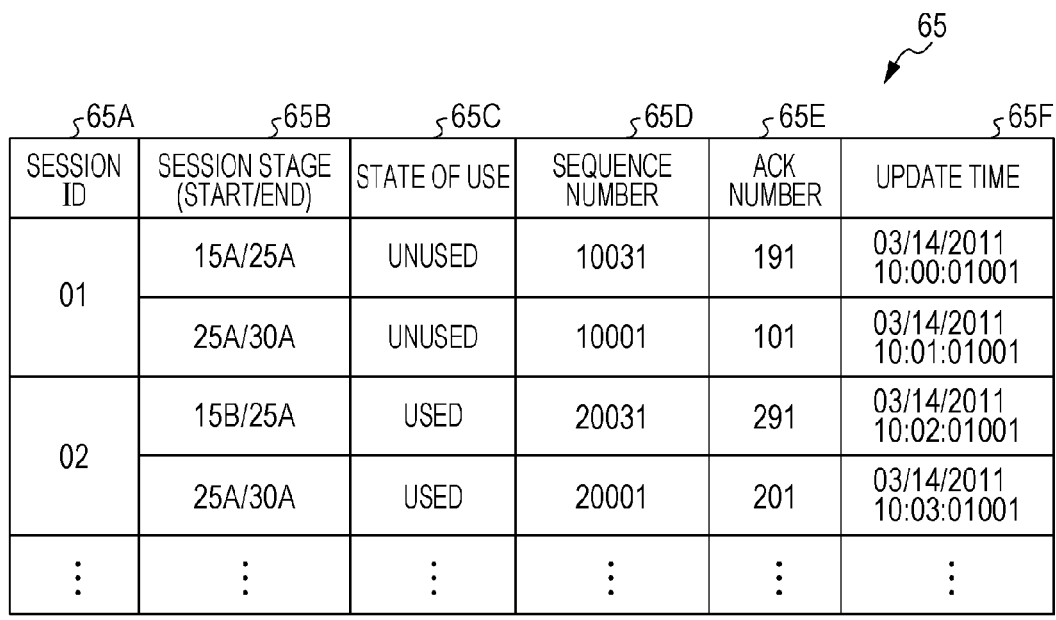
FIG. 4 is an explanatory diagram which depicts an example of data in a management table.

FIG. 4 is an explanatory diagram which depicts an example of data in the management table 65. States of use of respective sessions relayed by the relay server 20 having the management table 65, etc. are stored in the management table 65. A session ID 65A, a session stage (start and end) 65B, a state of use 65C, a sequence number 65D, an ACK number 65E and update time 65F are connected with one another and stored in the management table 65.

The session ID 65A indicates an ID for identifying a session established between the connection start terminal 10 and the router 30. The session stage 65B indicates starts and ends of sessions established between the connection start terminal 10 and the relay server 20 and between the relay server 20 and the router 30 related to and between the connection start terminal 10 and the router 30. The state of use 65C indicates a state of use of a session established on an applicable session stage, e.g., as "used" or "unused". The sequence number 65D indicates a latest sequence number used for communication on the applicable session stage. The ACK number 65E indicates an initial sequence number in a session on the applicable session stage to be received from the other end of the session. The update time 65F indicates time updated in a session on the applicable session stage.

Incidentally, the manager 25 refers to the management table 65 and is made aware of the session ID 65A, the session stage 65B, the state of use 65C, the sequence number 65D, the ACK number 65E and the update time 65F. The manager 25 pays attention, e.g., to "02" of the session ID 65A in FIG. 4, and is made aware, e.g., of sessions on session stages "15B/25A" and "25A/30A". Incidentally, the session stage "15B/25A" indicates a session stage established between the agent 15B in the connection start terminal 10B and the manager 25A in the applicable relay server 20A. Further, the session on the session stage "25A/30A" indicates a session stage established between the manager 25A in the applicable relay server 20 and the router 30A.

Upon paying attention to the session stage "15B/25A", the manage 25 is aware that the state of use 65C, the sequence number 65D, the ACK number 65E and the update time 65F are "used", "20031", "291", "03/14/2011 10:02:01001", respectively. Upon paying attention to the session stage "25A/30A", the manage 25 is aware that the state of use 65C, the sequence number 65D, the ACK number 65E and the update time 65F are "used", "20001", "201", "03/14/2011 10:03:01001", respectively. Further, the agent 15 is similarly made aware of a session ID 65A, a session stage 65B, a state of use 65C, a sequence number 65D, an ACK number 65E and update time 65F of each of sessions.

The deciding section 64 refers to content of the management table 65 on the basis of information on session establishment of a destination of a command analyzed by the analyzing section 63, and analyzes a state of use of a session established between the manager 15 in the relay server 20 and the router 30. Further, the relay section 62 relays a heartbeat message coming from the agent 15 to the router 30 by using an established session. As a result, the relay section 62 maintains a session established between the manager 25 and the router 30, as well as a session between the agent 15 and the manager 25 as a matter of course.

Further, after sessions are established between the agent 15 and the manager 25 and between the manager 25 and the router 30, the registering section 66 gives those sessions the session IDs 65A for identifying those established sessions. The registering section 66 registers session stages 65B indicating sessions established with the agent 15 and established with the router 30 each connected with the given session ID 65A in the management table 65.

Further, the registering section 66 registers a state of use of an established session corresponding to the session stage 65B, e.g., what is decided by the deciding section 64 in the management table 65 as the state of use 65C. Further, the registering section 66 receives a resultant reply corresponding to a command, e.g., a reply to data transmission from the router 30 by using the established session. Further, the registering section 66 registers the state of use 65C of the applicable established session as being "unused" in the management table 65 at the time when the reply to data transmission received from the router 30 is relayed to the connection start terminal 10.

The fixing section 67 communicates with a router 30 to be connected with by using the communication section 61, and obtains a limited maximum number of sessions which is established on the router 30 side. Incidentally, the fixing section 67 sends a command to the router 30 by using the communication section 61, so as to obtain the limited maximum number of sessions on the basis of commands "Show running-config" through "Line vty 0*". Further, the fixing section 67 performs broadcast communication with the respective relay servers 20, etc. connected with the applicable router 30 by using the communication section 61. Further, the fixing section 67 is made aware of the number of devices connected with the router 30 depending upon replies to the broadcast communication. The fixing section 67 decides an allowable number of sessions which is established by the own relay server 20 on the basis of the obtained limited maximum number of sessions and the obtained number of the connected devices by using an equation of (the limited maximum number of sessions/the number of the connected devices).

The lending section 68 sends a request for loan of a session to each of the relay servers 20 connected with the router 30 in broadcast communication by using the communication section 61. Incidentally, the request for loan of a session is to request another relay server 20 to lend an unused session not established yet. Further, upon detecting a request for loan coming from another relay server 20, the lending section 68 lends the relay server having requested the loan a session not established yet within an allowable number of sessions that the own device has autonomously decided.

Upon detecting a session not established yet lent by another relay server 20, the fixing section 67 updates the allowable number of sessions of the own device according to the number of lent sessions not established yet depending upon the number of lent sessions not established yet. If the current allowable number of sessions is "5" and the number of lent sessions is "1", e.g., the fixing section 67 that the session is lent to adds the number of lent sessions to the current allowable number of sessions so as to update the allowable number of sessions to "5+1", i.e., "6".

Further, if the current allowable number of sessions is "5" and the number of sessions not established yet lent by the fixing section 67 of the relay server 20 which lends a session not established yet is "1", the fixing section 67 subtracts the number of lent sessions from the current allowable number of sessions so as to update the allowable number of sessions to "5−1", i.e., "4". The control section 69 entirely controls the manager 25 and controls establishment of a new session within the allowable number of sessions.

Figure 5:
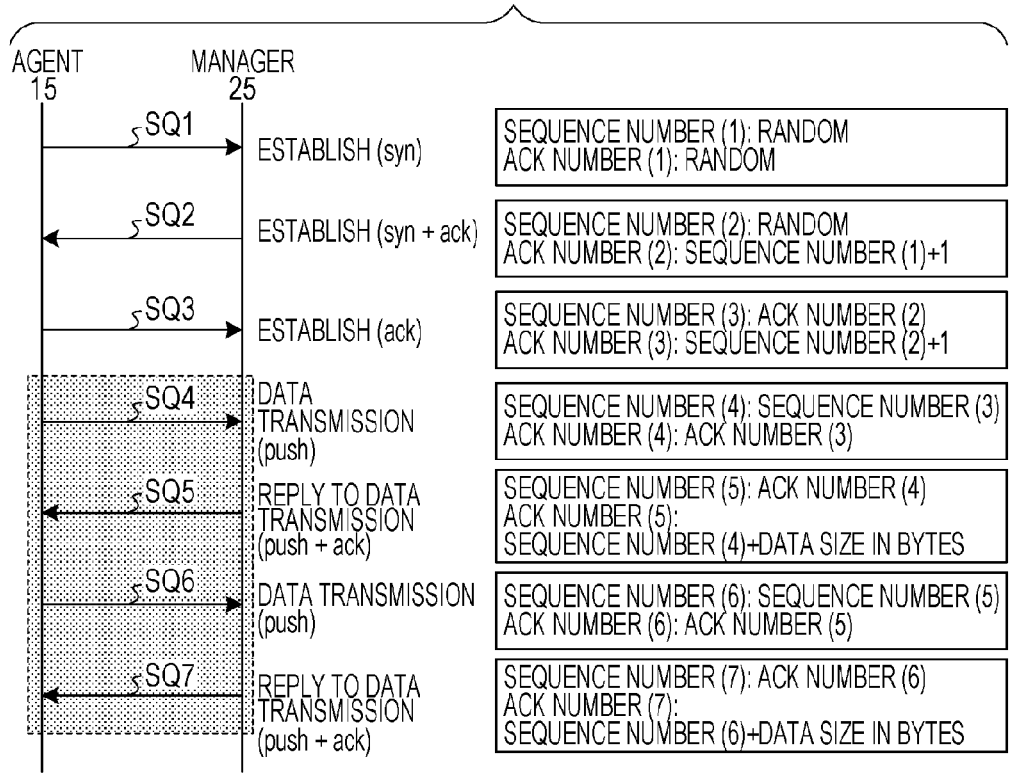
FIG. 5 is an explanatory diagram which depicts an exemplary relation between a sequence number and an ACK number.

Further, a relationship between the sequence number 65D and the ACK number 65E in the management table 65 will be explained. FIG. 5 is an explanatory diagram which depicts an exemplary relationship between the sequence number 65D and the ACK number 65E. The agent 15, e.g., sends a request for establishment (syn) to the manager 25 (SQ1). At this time, the request for establishment (syn) includes random numbers as a sequence number "1" and an ACK number "1", i.e., an initial sequence number to be received from the manager 25 next. Thus, the manager 25 is aware of the initial sequence number to be sent to the agent 15 on the basis of the ACK number "1" in advance.

Further, upon receiving the request for establishment (syn), the manager 25 sends a reply to establishment (syn+ack) to the agent 15 (SQ2). At this time, the reply to establishment (syn+ack) includes a random number as a sequence number "2" and a sequence number "1"+1 as an ACK number "2", i.e., an initial sequence number to be received from the agent 15 next. Thus, the agent 15 is aware of the initial sequence number to be sent to the manager 25 on the basis of the ACK number "2" in advance.

Further, upon receiving the reply to establishment (syn+ack), the agent 15 sends an acknowledgment of establishment (ack) to the manager 25 (SQ3). At this time, the acknowledgment of establishment includes the ACK number "2" as a sequence number "3" and a sequence number "2"+1 as an ACK number "3", i.e., an initial sequence number to be received from the manager 25 next. Thus, the manager 25 is aware of the initial sequence number to be sent to the agent 15 on the basis of the ACK number "3" in advance.

Further, after receiving the acknowledgment of establishment, the agent 15 sends a data transmission (push) frame to the manager 25 (SQ4). At this time, the data transmission (push) frame includes the sequence number "3" as a sequence number "4" and the ACK number "3" as an ACK number "4", i.e., an initial sequence number to be received from the manager 25 next. Thus, the manager 25 is aware of the initial sequence number to be sent to the agent 15 on the basis of the ACK number "4" in advance. Further, after receiving the data transmission (push) frame, the manager 25 sends a reply to data transmission (push+ack) to the agent 15 (SQ5). At this time, the reply to data transmission (push+ack) includes the ACK number "4" as a sequence number "5", the sequence number "4" as an ACK number "5", i.e., an initial sequence number to be received from the agent 15 next, and size of applicable data in bytes. Thus, the agent 15 is aware of the initial sequence number to be sent to the manager 25 on the basis of the ACK number "5" in advance.

Further, the agent 15 sends a data transmission (push) frame to the manager 25 (SQ6). At this time, the data transmission (push) frame includes the sequence number "5" as a sequence number "6" and the ACK number "5" as an ACK number "6", i.e., an initial sequence number to be received from the manager 25 next. Thus, the manager 25 is aware of the initial sequence number to be sent to the agent 15 on the basis of the ACK number "6" by the use of a same established session in advance.

Further, after receiving the data transmission (push) frame, the manager 25 sends a reply to data transmission (push+ack) to the agent 15 (SQ7). At this time, the reply to data transmission (push+ack) includes the ACK number "6" as a sequence number "7", the sequence number "6" as an ACK number "7", i.e., an initial sequence number to be received from the agent 15 next, and size of applicable data in bytes. Thus, the agent 15 is aware of the initial sequence number to be sent to the manager 25 by the use of the same established session on the basis of the ACK number "6" in advance.

The registering section 66 registers the sequence number 65D and the ACK number 65E in the management table 65 for a sequence of every session stage between the agent 15 and the manager 25. Thus, the manager 25 is aware of the initial sequence number related to the applicable established session in advance with reference to the sequence number 65D and the ACK number 65E in the management table 65, and so the agent 15. As a result, the manager 25 and the agent 15 smoothly perform command communication, i.e., data transmission and reply to data transmission even by using an established "unused" session repeatedly.

Incidentally, as depicted in FIG. 5, e.g., the sequence number 65D and the ACK number 65E are managed for a sequence of every session established between the agent 15 and the manager 25. The sequence number 65D and the ACK number 65E are managed as well, however, for a sequence of every session established between the manager 25 and the router 30. That is, the manager 25 is aware of the initial sequence number of the established session in advance with reference to the sequence number 65D and the ACK number 65E in the management table 65, and so the router 30. As a result, the manager 25 and the router 30 smoothly perform data transmission and reply to data transmission even by using an established "unused" session repeatedly.

Figure 6:
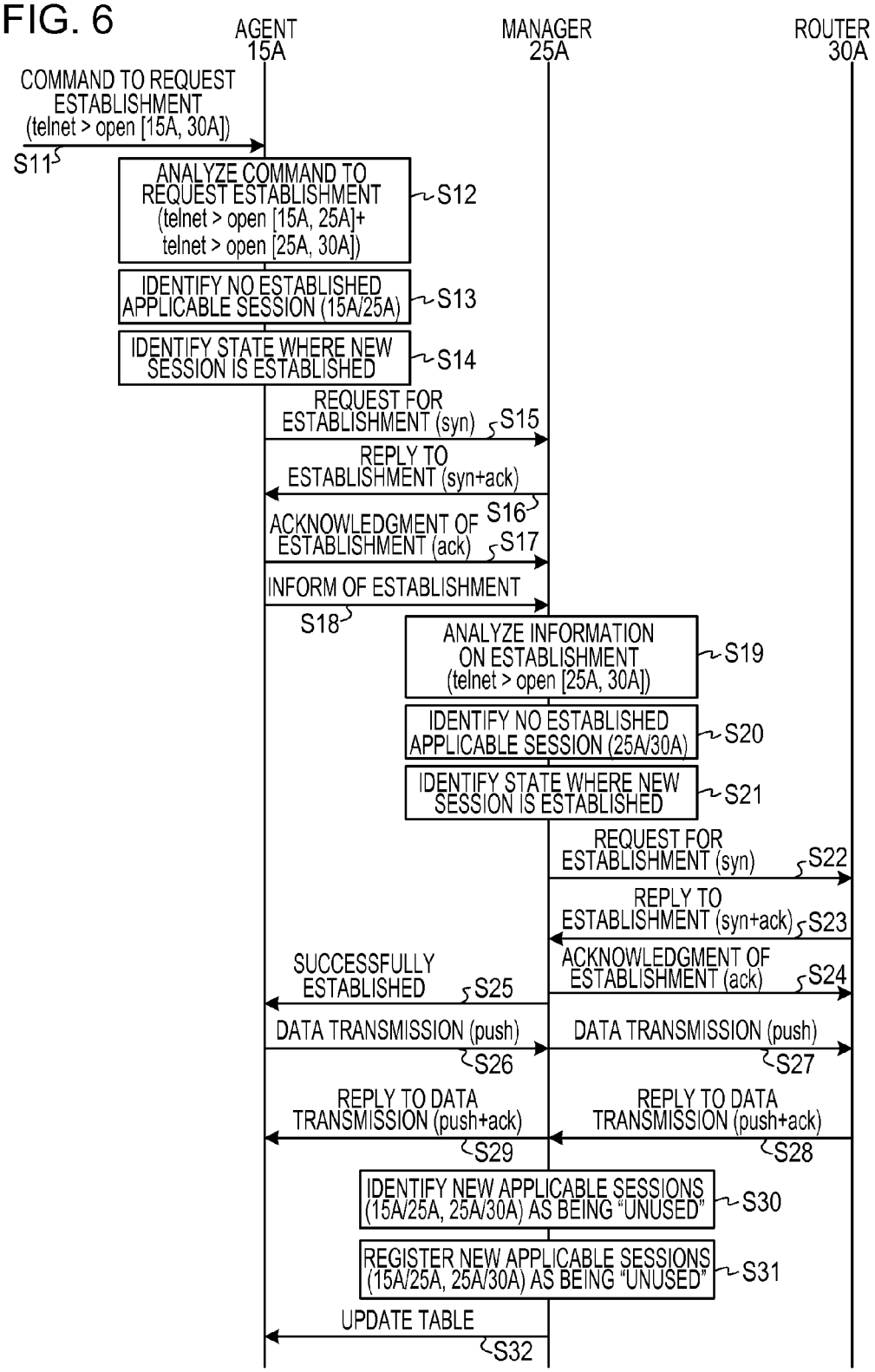
FIGS. 6-11 are each a sequence diagram which depicts an exemplary operation of the relay system related to command communication.

Then, how the relay system 1 of the first embodiment works will be explained. FIG. 6 is a sequence diagram which depicts an exemplary operation of the relay system 1 related to command communication. Suppose that no applicable sessions are established between the agent 15A and the manager 25A or between the manager 25A and the router 30A, and the relay system 1 depicted in FIG. 6 is under the conditions that a new session is established. Incidentally, the conditions that a new session is established mean conditions that a new session is established within a limited maximum number of sessions of the router 30A and within an allowable number of sessions of the relay server 20A, i.e., conditions that new sessions is established between the agent 15 A and the manager 25A and between the manager 25A and the router 30A.

The detecting section 51 of the agent 15A of the connection start terminal 10A depicted in FIG. 6 detects a command to request establishment telnet>open [15A, 30A] (operation S11). Upon detecting the command to request establishment, the analyzing section 52 of the agent 15A analyzes the command to request establishment (operation S12). The analyzing section 52 divides the command to request establishment telnet>open [15A, 30A] into two stages, i.e., commands telnet>open [15A, 25A] and telnet>open [25A, 30A]. That is, the analyzing section 52 divides a session between the agent 15A and the router 30A into sessions between the agent 15A and the manager 25A and between the manager 25A and the router 30A.

The deciding section 53 of the agent 15A refers to the management table 65 in the manager 25A and analyzes a session established between the agent 15A and the manager 25A corresponding to a destination of the command. The deciding section 53 identifies no established session (15A/25A) corresponding to the destination of the command on the basis of the analysis (operation S13). Further, upon identifying no established session (15A/25A), the deciding section 53 decides whether the relay system 1 is under the conditions that a new session is established.

If the relay system 1 is identified as being under the conditions that a new session is established (operation S14), the communication section 54 sends a request for establishment (syn) to the manager 25A so as to establish a new session on the basis of the command telnet>open [15A,25A] (operation S15). Further, upon receiving the request for establishment (syn) from the agent 15A, the relay section 62 of the manager 25A sends a reply to establishment (syn+ack) to the agent 15A (operation S16). Further, upon receiving the reply to establishment (syn+ack) from the manager 25A, the communication section 54 of the agent 15A sends an acknowledgment of establishment (ack) to the manager 25A (operation S17). A new session is consequently established between the agent 15A and the manager 25A. Thus, the registering section 66 of the manager 25A registers the state of use 65C of the session (15A/25A) established between the agent 15A and the manager 25A as being "used" in the management table 65.

Further, the communication section 54 of the agent 15A notifies the manager 25A of information on session establishment on the destination of the command telnet>open [25A, 30A] separated at the operation S12 (operation S18). The analyzing section 63 of the manager 25A analyzes the information on the session establishment on the destination of the command (operation S19). The deciding section 64 of the manager 25A refers to the management table 65 so as to analyze a session established between the manager 25A and the router 30A corresponding to the destination of the command. Upon identifying no established session (25A/30A) corresponding to the destination of the command (operation S20), the deciding section 64 decides whether the relay system 1 is under the conditions that a new session is established. If the relay system 1 is identified as being under the conditions that a new session is established (operation S21), the relay section 62 sends a request for establishment (syn) to the router 30A so as to establish a new session on the basis of the command telnet>open [25A, 30A] (operation S22). Upon receiving the request for establishment (syn) from the manager 25A, the router 30A sends a reply to establishment (syn+ack) to the manager 25A (operation S23).

Further, upon receiving the reply to establishment (syn+ack) from the router 30A, the relay section 62 of the manager 25A sends an acknowledgment of establishment (ack) to the router 30A (operation S24). A new session is consequently established between the manager 25A and the router 30A. That is, the sessions are established between the agent 15A and the router 30A via the manager 25A. Thus, the registering section 66 of the manager 25A registers the state of use 65C of the session established between the manager 25A and the router 30A as being "used" in the management table 65.

Upon sending the acknowledgment of establishment (ack) to the router 30A, the relay section 62 sends, to the agent 15A, a reply of successful establishment indicating that the sessions are successfully established between the agent 15A and the manager 25A and between the manager 25A and the router 30A (operation S25). Further, upon receiving the reply of successful establishment, the communication section 54 of the agent 15A sends a data transmission (push) frame corresponding to the command to the manager 25A by using the established new session (15A/25A) (operation S26).

Further, the relay section 62 of the manager 25A relays the data transmission (push) frame coming from the agent 15A to the router 30A by using the established new session (25A/30A) (operation S27). As a result, upon receiving the data transmission (push) frame, the router 30A carries out what is commanded corresponding to the data transmission (push) frame and obtains a resultant reply to the command.

The router 30A sends a reply to data transmission (push+ack), i.e., a resultant reply to the command to the manager 25 by using the established session (25A/30A) (operation S28). Upon receiving the reply to data transmission (push+ack), the relay section 62 of the manager 25A relays the reply to data transmission (push+ack) to the agent 15A (operation S29). The agent 15A has consequently operated the router 30A by remote control by using the new sessions via the manager 25A.

Upon relaying the reply to data transmission (push+ack) coming from the router 30A to the agent 15A, the control section 69 of the manager 25A identifies the state of use of the established new sessions (15A/25A, 25A/30A) as being "unused" (operation S30). Then, the registering section 66 of the manager 25A updates the state of use 65C of the established new sessions as being "unused" in the management table 65 (operation S31). The communication section 61 sends a frame indicating the update of the management table 65 to the agent 15A (operation S32). The agent 15A is consequently aware that the state of use of the established sessions is updated as being "unused".

Under the conditions that no applicable session is established and a new session is established as depicted in FIG. 6, e.g., establish new sessions between the agent 15A and the manager 25A and between the manager 25A and the router 30A. The established new sessions are used for command-related data transmission and reply to data transmission to be carried out between the agent 15A and the router 30A.

Figure 7:
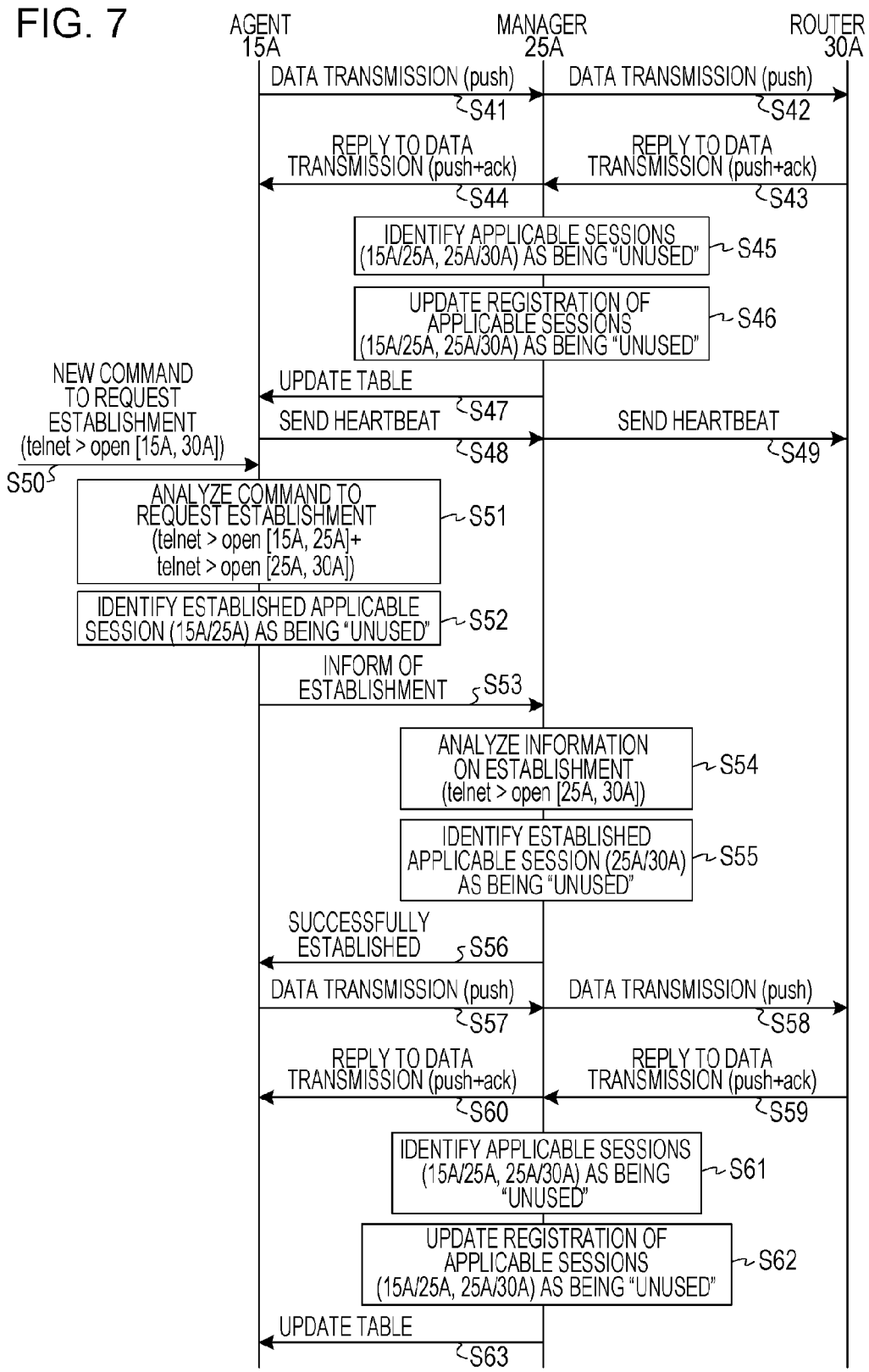

FIG. 7 is a sequence diagram which depicts an exemplary operation of the relay system 1 related to command communication. Suppose that the relay system 1 depicted in FIG. 7 is under the conditions that sessions established between the agent 15A and the manager 25A and between the manager 25A and the router 30A are being "unused".

The communication section 54 of the agent 15A depicted in FIG. 7 sends a data transmission (push) frame corresponding to a command by using the established session (15A/25A) (operation S41). Further, upon receiving the data transmission (push) frame from the agent 15A, the relay section 62 of the manager 25A relays the data transmission (push) frame to the router 30A by using the established session (25A/30A) (operation S42). Upon receiving the data transmission (push) frame, the router 30A consequently carries out what is commanded corresponding to the data transmission so as to obtain a resultant reply to the command.

Further, the router 30A sends a reply to data transmission (push+ack), i.e., the resultant reply to the command to the manager 25A by using the established session (25A/30A) (operation S43). Upon receiving the reply to data transmission (push+ack), the relay section 62 of the manager 25A relays the reply to data transmission (push+ack) to the agent 15A by using the established session (25A/15A) (operation S44). The agent 15A consequently operates the router 30A by remote control by using the established sessions (15A/25A, 25A/30A) via the manager 25A.

Upon relaying the reply to data transmission (push+ack) coming from the router 30A to the agent 15A, the control section 69 of the manager 25A identifies the state of use of the established sessions (15A/25A, 25A/30A) as being "unused" (operation S45). Then, the registering section 66 of the manager 25A updates the state of use 65C of the established sessions (15A/25A, 25A/30A) as being "unused" in the management table 65 (operation S46). The communication section 61 of the manager 25A sends a frame indicating the table update to the agent 15A (operation S47). The agent 15A is consequently aware that the state of use 65C of the established sessions (15A/25A, 25A/30A) is updated as being "unused".

Further, the continuing section 55 of the agent 15A periodically sends a heartbeat massage to the manager 25A at such intervals that the session established on the side of the router 30A is maintained (operation S48). The session established between the manager 25A and the agent 15A is thereby maintained. Further, the relay section 62 of the manager 25A relays the heartbeat message coming from the agent 15A to the router 30A (operation S49). The session established between the router 30A and the manager 25A is maintained. The sessions (15A/25A, 25A/30A) established between the router 30A and the connection start terminal 10 are consequently maintained via the relay server 20A.

The detecting section 51 of the agent 15A detects a new command to request establishment telnet>open [15A, 30A] of another application from the telnet running section 14 (operation S50). The analyzing section 52 analyzes the command to request establishment and divides the command to request establishment telnet>open [15A, 30A] into two stages, i.e., commands telnet>open [15A, 25A] and telnet>open [25A, 30A] (operation S51). That is, the analyzing section 52 divides a session stage between the agent 15A and the router 30A into sessions between the agent 15A and the manager 25A and between the manager 25A and the router 30A.

The deciding section 53 of the agent 15A refers to the management table 65 of the manager 25A and analyzes a session established between the agent 15A and the manager 25A corresponding to the destination of the command. The deciding section 53 identifies an established session corresponding to the destination of the command remains "unused" (operation S52). At this time, the registering section 66 of the manager 25A registers the state of use 65C of the session established between the agent 15A and the manager 25A as being "used" in the management table 65. Then, the communication section 54 sends information on the session establishment of the command telnet>open [25A, 30A] separated at the operation S51 to the manager 25A by using the established "unused" session corresponding to the destination of the command (operation S53). The analyzing section 63 of the manager 25A analyzes the information on session establishment on the destination of the command (operation S54). The deciding section 64 of the manager 25A refers to the management table 65 and analyzes a session established between the manager 25A and the router 30A corresponding to the destination of the command. The deciding section 64 identifies an established "unused" session corresponding to the destination of the command (operation S55). The relay section 62 uses the established "unused" session corresponding to the destination of the command. At this time, the registering section 66 of the manager 25A registers the state of use 65C of the session established between the manager 25A and the router 30A as being "used" in the management table 65.

Then, if an established "unused" session is identified, the relay section 62 sends, to the agent 15A, a reply of successful establishment indicating that the sessions are successfully established between the agent 15A and the manager 25A and between the manager 25A and the router 30A (operation S56). Further, upon receiving the reply of successful establishment, the communication section 54 of the agent 15A sends a data transmission (push) frame corresponding to the command to the manager 25A by using an established new session (15A/25A) (operation S57). Further, the relay section 62 of the manager 25A relays the data transmission (push) frame coming from the agent 15A to the router 30A by using the established "unused" session (25A/30A) (operation S58). As a result, upon receiving the data transmission (push) frame, the router 30A carries out what is commanded corresponding to the data transmission (push) and obtains a resultant reply to the command.

Further, the router 30A sends a reply to data transmission (push+ack), i.e., the resultant reply to the command to the manager 25 by using the established "unused" session (25A/30A) (operation S59). Upon receiving the reply to data transmission (push+ack), the relay section 62 of the manager 25A relays the reply to data transmission (push+ack) to the agent 15A (operation S60). The agent 15A consequently operates the router 30A by remote control by using the established "unused" sessions via the manager 25A.

Upon relaying the reply to data transmission (push+ack) coming from the router 30A to the agent 15A, the control section 69 of the manager 25A identifies the state of use of the established sessions (15A/25A, 25A/30A) as being "unused" (operation S61). Then, the registering section 66 in the manager 25A updates the state of use 65C of the established sessions as being "unused" in the management table 65 (operation S62). The communication section 61 sends a frame indicating the update of the table to the agent 15A (operation S63). The agent 15A is consequently aware that the state of use of the established sessions is updated as being "unused".

Under the conditions that the sessions established between the agent 15A and the manager 25A and between the manager 25A and the router 30A are "unused" as depicted in FIG. 7, e.g., the relay system 1 carries out data transmission and reply to data transmission related to a command of another application between the agent 15A and the router 30A by using the applicable established "unused" sessions.

Figure 8:
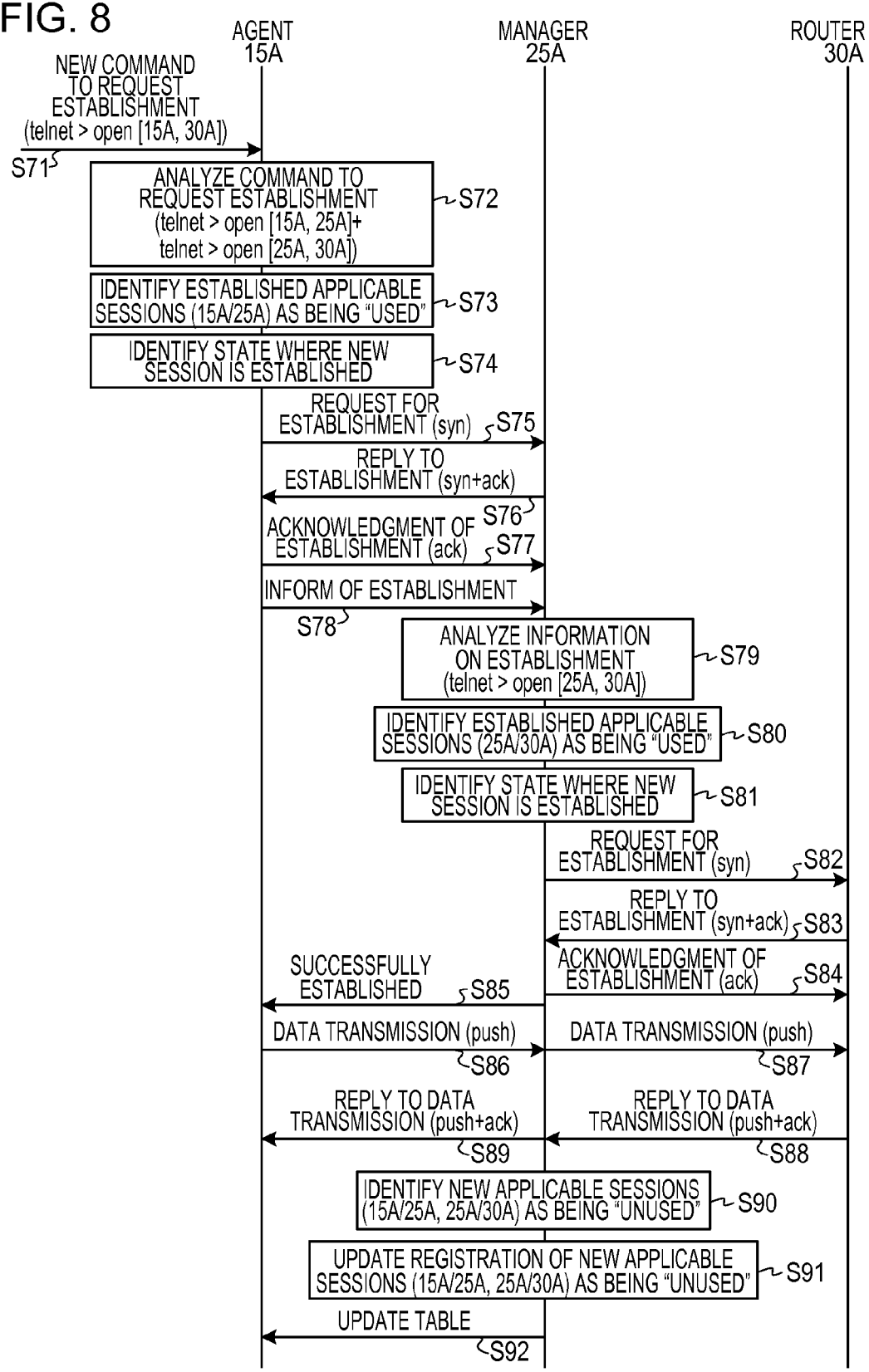

FIG. 8 is a sequence diagram which depicts an exemplary operation of the relay system 1 related to command communication. Suppose that the relay system 1 depicted in FIG. 8 is under the conditions that sessions established between the agent 15A and the router 30A are in a "used" state of use and a new session is further established.

The detecting section 51 of the agent 15A depicted in FIG. 8 detects a new command to request establishment telnet>open [15A, 30A] coming from another application from the telnet running section 14 (operation S71). The analyzing section 52 of the agent 15A analyzes the command to request establishment and divides the command to request establishment telnet>open [15A, 30A] into two stages, i.e., commands telnet>open [15A, 25A] and telnet>open [25A, 30A] (operation S72). That is, the analyzing section 52 divides a session stage between the agent 15A and the router 30A into sessions between the agent 15A and the manager 25A and between the manager 25A and the router 30A.

The deciding section 53 of the agent 15A refers to the management table 65 in the manager 25A and analyzes an "unused" session established between the agent 15A and the manager 25A corresponding to a destination of the command. Upon identifying no established session (15A, 25A) corresponding to the destination of the command remains "unused", i.e., identifying any established session as being "used" (operation S73), the deciding section 53 decides whether the relay system 1 is under the conditions that a new session is established.

If the relay system 1 is identified as being under conditions that a new session is established (operation S74), the communication section 54 of the agent 15A sends a request for establishment (syn) to the manager 25A so as to establish a new session on the basis of the command telnet>open [15A, 25A] (operation S75). Further, upon receiving the request for establishment (syn) from the agent 15A, the relay section 62 of the manager 25A sends a reply to establishment (syn+ack) to the agent 15A (operation S76). Further, upon receiving the reply to establishment (syn+ack) from the manager 25A, the communication section 54 of the agent 15A sends an acknowledgment of establishment (ack) to the manager 25A (operation S77). A new session is consequently established between the agent 15A and the manager 25A. Thus, the registering section 66 of the manager 25A registers the state of use of the session (15A/25A) established between the agent 15A and the manager 25A as being "used" in the management table 65.

Further, the communication section 54 of the agent 15A sends, to the manager 25A, information on session establishment on the destination of the command telnet>open [25A, 30A] separated at the operation S72 (operation S78). The analyzing section 63 of the manager 25A analyzes the information on session establishment on the destination of the command (operation S79). The deciding section 64 of the manager 25A refers to the management table 65 so as to analyze an "unused" session established between the manager 25A and the router 30A corresponding to the destination of the command. Upon identifying no "unused" established session (25A/30A) corresponding to the destination of the command, i.e., identifying that any session is being "used" (operation S80), the deciding section 64 decides whether the relay system 1 is under the conditions that a new session is established.

If the relay system 1 is identified as being under the conditions that a new session is established (operation S81), the relay section 62 sends a request for establishment (syn) to the router 30A so as to establish a new session on the basis of the command telnet>open [25A, 30A] (operation S82). Upon receiving the request for establishment (syn) from the manager 25A, the router 30A sends a reply to establishment (syn+ack) to the manager 25A (operation S83). Further, upon receiving the reply to establishment (syn+ack) from the router 30A, the relay section 62 of the manager 25A sends an acknowledgment of establishment (ack) to the router 30A (operation S84). A new session is consequently established between the manager 25A and the router 30A. That is, sessions are established between the agent 15A and the router 30A via the manager 25A. Thus, the registering section 66 of the manager 25A registers the state of use 65C of the session established between the manager 25A and the router 30A (25A/30A) as being "used" in the management table 65.

Upon sending the acknowledgment of establishment (ack), the relay section 62 sends, to the agent 15A, a reply of successful establishment indicating that the sessions are successfully established (operation S85). Further, upon receiving the reply of the successful establishment, the communication section 54 of the agent 15A sends a data transmission (push) frame corresponding to the command to the manager 25A by using the established new session (15A/25A) (operation S86). Further, the relay section 62 of the manager 25A relays the data transmission (push) frame coming from the agent 15A to the router 30A by using the established new session (25A/30A) (operation S87). As a result, upon receiving the data transmission (push) frame, the router 30A carries out what is commanded corresponding to the data transmission (push) and obtains a resultant reply to the command.

Further, the router 30A sends a reply to data transmission (push+ack), i.e., the resultant reply to the command to the manager 25A by using the established session (25A/30A) (operation S88). Upon receiving the reply to data transmission (push+ack), the relay section 62 of the manager 25A sends the reply to data transmission (push+ack) to the agent 15A (operation S89). The agent 15A consequently operates the router 30A by remote control by using the established new sessions via the manager 25A.

Upon relaying the reply to data transmission (push+ack) coming from the router 30A to the agent 15A, the control section 69 of the manager 25A identifies the state of use of the established new sessions (15A/25A, 25A/30A) as being "unused" (operation S90). Then, the registering section 66 of the manager 25A updates the state of use 65C of the established new sessions as being "unused" in the management table 65 (operation S91). The communication section 61 sends a frame indicating the update of the table to the agent 15A (operation S92). The agent 15A is consequently aware that the state of use of the established sessions is updated as being "unused".

Under the conditions that the sessions established between the agent 15A and the manager 25A and between the manager 25A and the router 30A are "used" and a new session is established as depicted in FIG. 8, e.g., the relay system 1 carries out data transmission and reply to data transmission related to the command of another application between the agent 15A and the router 30A by using the new sessions.

Figure 9:
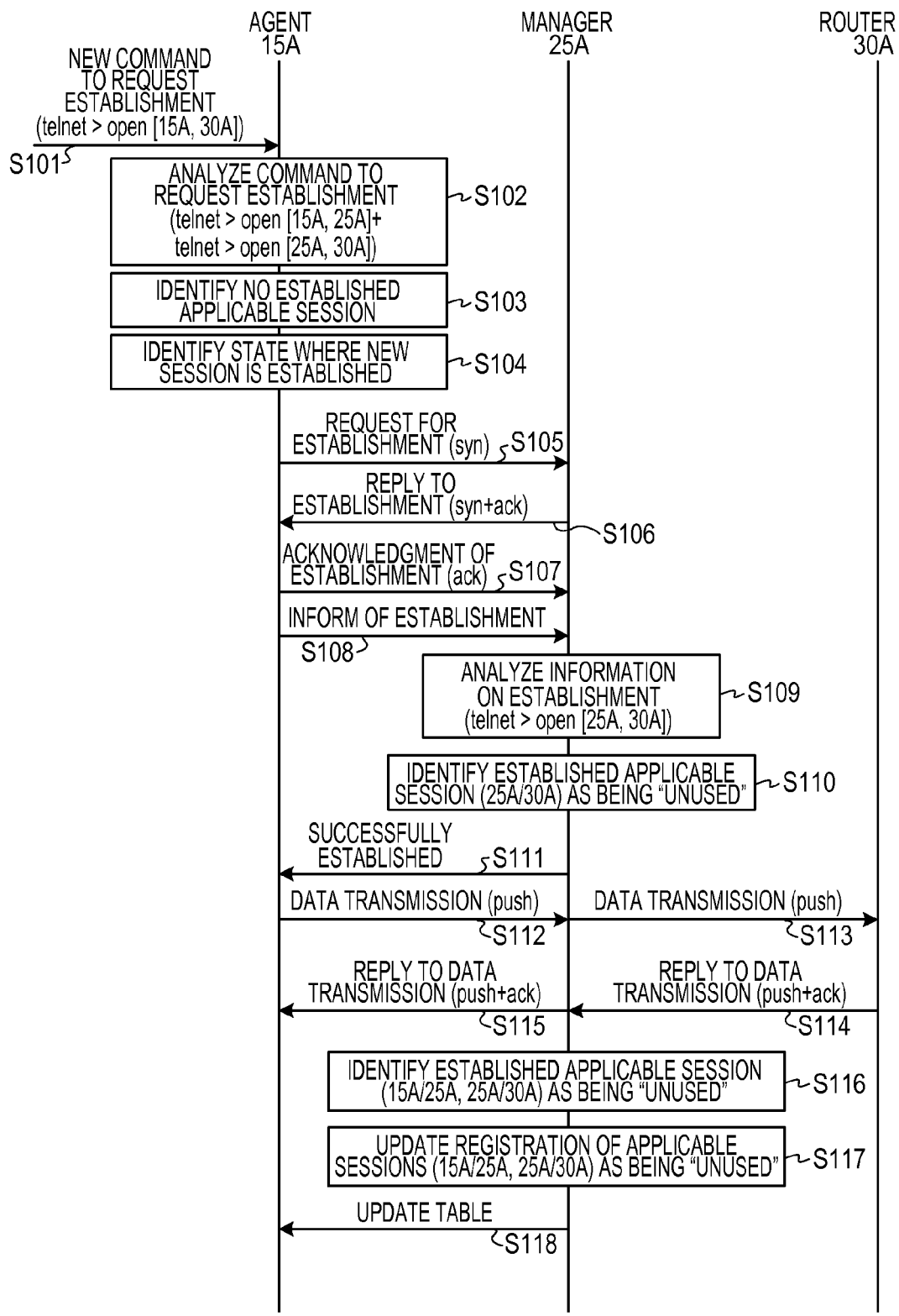

FIG. 9 is a sequence diagram which depicts an exemplary operation of the relay system 1 related to command communication. Suppose that the relay system 1 depicted in FIG. 9 is under the conditions that sessions established between the agent 15A and the manager 25A and between the manager 25A and the router 30A are being "used" and "unused", respectively, and a new session is established.

The detecting section 51 of the agent 15A depicted in FIG. 9 detects a command to request session establishment telnet>open [15A, 30A] of another application from the telnet running section 14 (operation S101). The analyzing section 52 analyzes the command to request establishment and divides the command to request establishment telnet>open [15A, 30A] into two stages, i.e., commands telnet>open [15A, 25A] and telnet>open [25A, 30A] (operation S102). That is, the analyzing section 52 divides a session stage between the agent 15A and the router 30A into sessions between the agent 15A and the manager 25A and between the manager 25A and the router 30A.

The deciding section 53 of the agent 15A refers to the management table 65 in the manager 25A and analyzes the session (15A, 25A) established between the agent 15A and the manager 25A corresponding to a destination of the command. Upon identifying no established "unused" session (operation S103), the deciding section 53 decides whether the relay system 1 is under the conditions that a new session is established. If the relay system 1 is identified as being under conditions that a new session is established (operation S104), the communication section 54 sends a request for establishment (syn) to the manager 25A so as to establish a new session on the basis of the command telnet>open [15A,25A] (operation S105).

Upon receiving the request for establishment (syn) from the agent 15A, the relay section 62 of the manager 25A sends a reply to establishment (syn+ack) to the agent 15A (operation S106). Further, upon receiving the reply to establishment (syn+ack) from the manager 25A, the communication section 54 of the agent 15A sends an acknowledgment of establishment (ack) to the manager 25A (operation S107). A session is consequently established between the agent 15A and the manager 25A. Thus, the registering section 66 of the manager 25A registers the state of use 65C of the session (15A/25A) established between the agent 15A and the manager 25A as being "used" in the management table 65.

Further, the communication section 54 of the agent 15A sends, to the manager 25A, information on session establishment of the command telnet>open [25A, 30A] separated at the operation S102 (operation S108). The analyzing section 63 of the manager 25A analyzes the information on the session establishment corresponding to the destination of the command (operation S109). The deciding section 64 of the manager 25A refers to the management table 65 so as to analyze the sessions established between the agent 15A and the router 30A corresponding to the destination of the command. The deciding section 64 identifies an established "unused" session of the destination of the command (operation S110).

The relay section 62 uses the session established between the manager 25A and the router 30A. Then, the sessions are established between the agent 15A and the router 30A via the manager 25A. Thus, the registering section 66 of the manager 25A registers the state of use 65C of the session established between the manager 25A and the router 30A as being "used" in the management table 65.

If an established "unused" session is identified, the relay section 62 sends, to the agent 15A, a reply of successful establishment indicating that the sessions are successfully established (operation S111). Further, upon receiving the reply of successful establishment, the communication section 54 of the agent 15A sends a data transmission (push) frame corresponding to the command to the manager 25A by using the established new session (15A/25A) (operation S112). Further, upon receiving the data transmission (push) frame from the agent 15A, the relay section 62 of the manager 25A relays the data transmission (push) frame to the router 30A by using the established session (25A/30A) (operation S113). As a result, upon receiving the data transmission (push) frame, the router 30A carries out what is commanded corresponding to the data transmission (push) and obtains a resultant reply to the command.

The router 30A sends a reply to data transmission (push+ack), i.e., a resultant reply to the command to the manager 25 by using the established session (25A/30A) (operation S114). Upon receiving the reply to data transmission (push+ack), the relay section 62 of the manager 25A sends the reply to data transmission (push+ack) to the agent 15A (operation S115). The agent 15A consequently operates the router 30A by remote control by using the established "unused" sessions via the manager 25A.

Upon relaying the reply to data transmission coming from the router 30A to the agent 15A, the control section 69 in the manager 25A identifies the state of use of the established sessions (15A/25A, 25A/30A) as being "unused" (operation S116). Then, the registering section 66 in the manager 25A updates the state of use 65C of the established sessions as being "unused" in the management table 65 (operation S117). The communication section 61 sends a frame indicating the update of the management table 65 to the agent 15A (operation S118). The agent 15A is consequently aware that the state of use of the established sessions is updated as being "unused".

Under the conditions that sessions established between the agent 15A and the manager 25A and between the manager 25A and the router 30A are "used" and "unused", respectively, and a new session is established as depicted in FIG. 9, e.g., the relay system 1 carries out data transmission and reply to data transmission related to a command of another application by using new and "unused" sessions.

Figure 10:
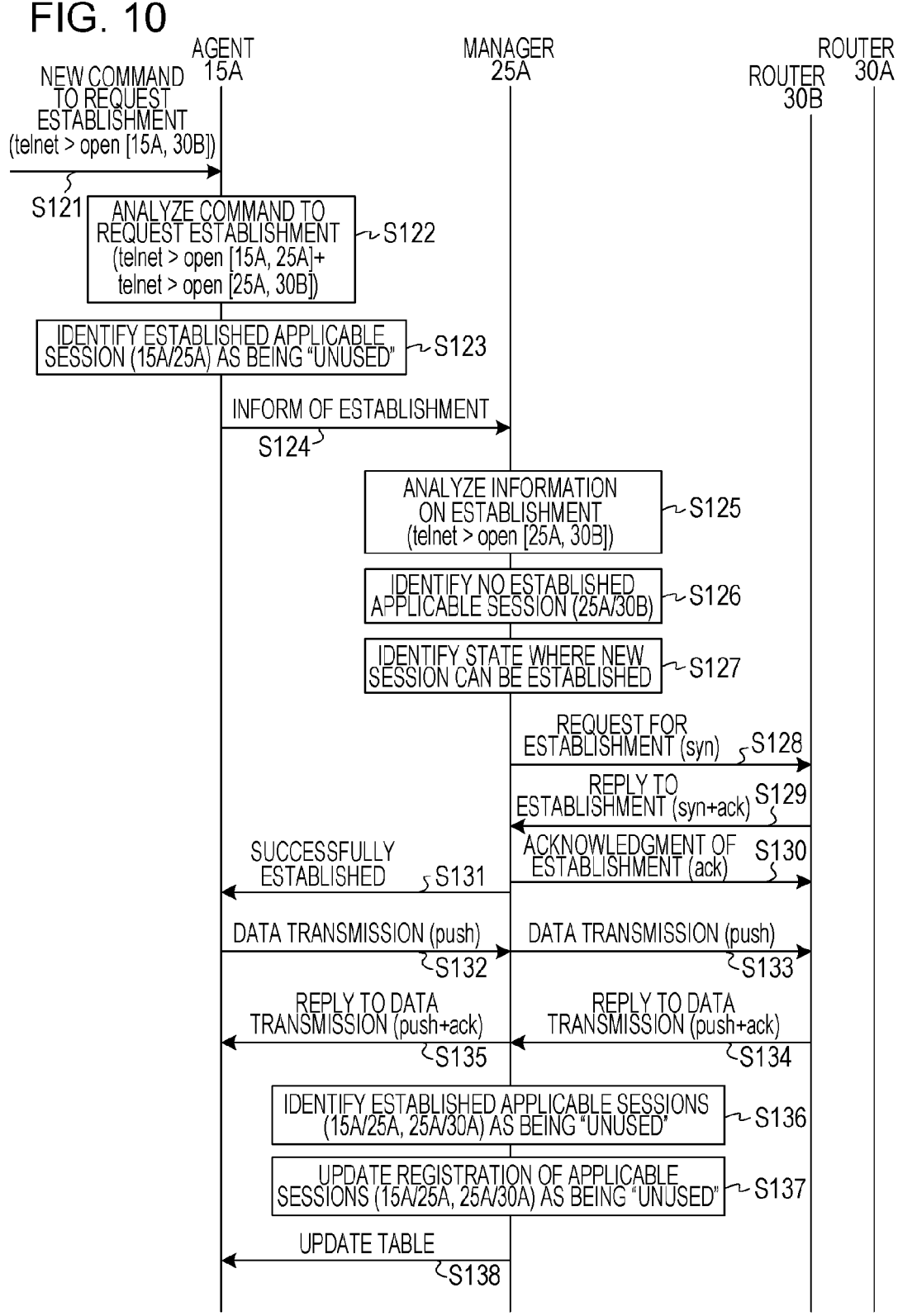

FIG. 10 is a sequence diagram which depicts an exemplary operation of the relay system 1 related to command communication. Suppose that the relay system 1 depicted in FIG. 10 is under the conditions that sessions established between the agent 15A and the router 30A are in an "unused" state of use and the agent 15A is ready to send a new command to request establishment to the router 30B.

The detecting section 51 of the agent 15A depicted in FIG. 10 detects a command to request session establishment telnet>open [15A, 30B] coming from another application from the telnet running section 14 (operation S121). The analyzing section 52 analyzes the command to request establishment and divides the command to request establishment telnet>open [15A, 30B] into two stages, i.e., commands telnet>open [15A, 25A] and telnet>open [25A, 30B] (operation S122). That is, the analyzing section 52 divides a session stage between the agent 15A and the router 30B into sessions between the agent 15A and the manager 25A and between the manager 25A and the router 30B.

The deciding section 53 of the agent 15A refers to the management table 65 of the manager 25A and analyzes a session established between the agent 15A and the manager 25A corresponding to a destination of the command. The deciding section 53 identifies an established session being in an "unused" state of use (operation S123). The communication section 54 sends, to the manager 25A, information on session establishment of the destination of the command telnet>open [25A, 30B] separated at the operation S122 by using the established "unused" session (operation S124). The analyzing section 63 analyzes the information on the session establishment on the destination of the command (operation S125).

The deciding section 64 refers to the management table 65 so as to analyze a session established between the manager 25A and the router 30B of the destination of the command. Upon identifying no established applicable session (25A/30B) (operation S126), the deciding section 64 decides whether the relay system 1 is under the conditions that a new session is established. If the relay system 1 is identified as being under the conditions that a new session is established (operation S127), the relay section 62 sends a request for establishment (syn) to the router 30B so as to establish a new session on the basis of the command telnet>open [25A,30B] (operation S128). Further, upon receiving the request for establishment (syn) from the manager 25A, the router 30B sends a reply to establishment (syn+ack) to the manager 25A (operation S129).

Further, upon receiving the reply to establishment (syn+ack) from the router 30B, the relay section 62 of the manager 25A sends an acknowledgment of establishment (ack) to the router 30B (operation S130). A new session is consequently established between the manager 25A and the router 30B. That is, sessions are established between the agent 15A and the router 30B via the manager 25A. Thus, the registering section 66 of the manager 25A registers the state of use of the session (25A/30B) established between the manager 25A and the router 30B as being "used" in the management table 65.

Upon sending the acknowledgment of establishment (ack) to the router 30B, the relay section 62 sends, to the agent 15A, a reply of successful establishment indicating that the sessions are successfully established (operation S131). Further, upon receiving the reply of successful establishment, the communication section 54 of the agent 15A sends a data transmission (push) frame corresponding to the command to the manager 25A by using the established new session (15A/25A) (operation S132).

Further, upon receiving the data transmission (push) frame from the agent 15A, the relay section 62 of the manager 25A sends the data transmission (push) frame to the router 30B by using the established new session (25A/30B) (operation S133). As a result, upon receiving the data transmission (push) frame, the router 30B carries out what is commanded corresponding to the data transmission (push) and obtains a resultant reply to the command.

The router 30B sends a reply to data transmission (push+ack), i.e., the resultant reply to the command to the manager 25A by using the established session (25A/30B) (operation S134). Upon receiving the reply to data transmission (push+ack), the relay section 62 of the manager 25A relays the reply to data transmission (push+ack) to the agent 15A (operation S135). The agent 15A consequently operates the router 30B by remote control by using the established "unused" sessions via the manager 25A.

Upon relaying the reply to data transmission (push+ack) coming from the router 30B to the agent 15A, the control section 69 in the manager 25A identifies the established sessions (15A/25A, 25A/30A) as being "unused" state of use before being repeatedly used (operation S136). Then, the registering section 66 in the manager 25A updates the state of use 65C of the established sessions before being repeatedly used as being "unused" in the management table 65 (operation S137). The communication section 61 sends a frame indicating the update of the management table 65 to the agent 15A (operation S138). The agent 15A is consequently aware that the state of use of the established sessions is updated as being "unused". Incidentally, the registering section 66 may update the state of use of the established sessions (15A/25A, 25A/30B) after being used instead of updating the state of use of the established sessions before being repeatedly used at the operation S137.

As depicted in FIG. 10, e.g., data transmission and reply to transmission related to a command of another application are carried out by the use of an "unused" session established between the agent 15A and the manager 25A and a new session between the manager 25A and the router 30B.

Figure 11:
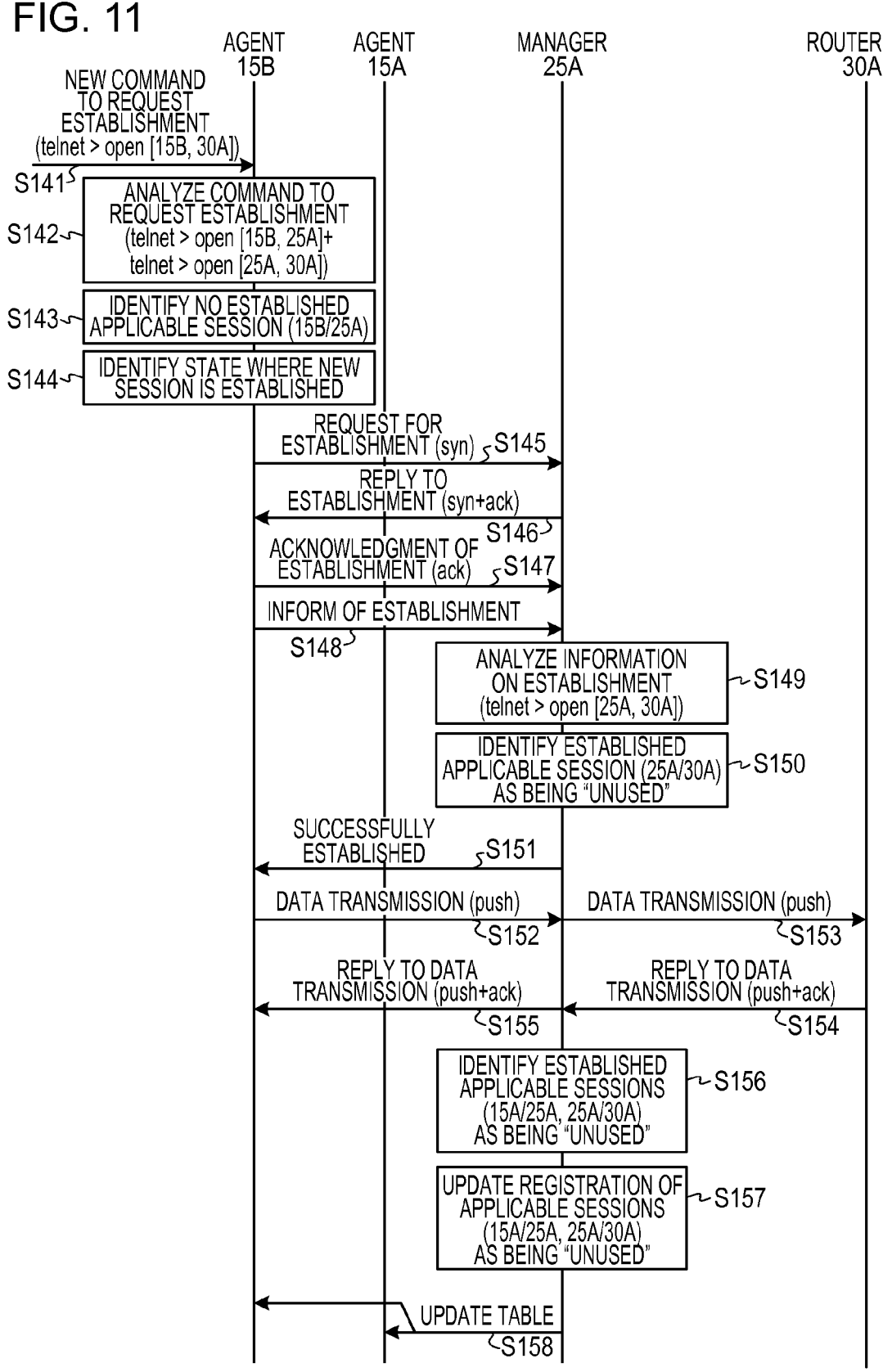

FIG. 11 is a sequence diagram which depicts an exemplary operation of the relay system 1 related to command communication. Suppose that the relay system 1 depicted in FIG. 11 is under the conditions that sessions established between the agent 15A and the router 30A are in an "unused" state of use and the agent 15B is ready to send a new command to request session establishment to the router 30A.

The detecting section 51 of the agent 15B depicted in FIG. 11 detects a new command to request establishment telnet>open [15B, 30A] of another client from the telnet running section 14 (operation S141). The analyzing section 52 analyzes the command to request establishment and divides the command to request establishment telnet>open [15B, 30A] into two stages, i.e., commands telnet>open [15B, 25A] and telnet>open [25A, 30A] (operation S142). That is, the analyzing section 52 divides a session stage between the agent 15B and the router 30A into sessions between the agent 15B and the manager 25A and between the manager 25A and the router 30A.

The deciding section 53 of the agent 15B refers to the management table 65 in the manager 25A and analyzes a session established between the agent 15B and the manager 25A corresponding to a destination of the command. Upon identifying no established "unused" session (15B/25A) corresponding to the destination of the command (operation S143), the deciding section 53 decides whether the relay system 1 is under the conditions that a new session is established.

If the relay system 1 is identified as being under the conditions that a new session is established (operation S144), the communication section 54 sends a request for establishment (syn) to the manager 25A so as to establish a new session on the basis of the command telnet>open [15B,25A] (operation S145). Further, upon receiving the request for establishment (syn) from the agent 15B, the relay section 62 of the manager 25A sends a reply to establishment (syn+ack) to the agent 15B (operation S146).

Further, upon receiving the reply to establishment (syn+ack) from the manager 25A, the communication section 54 of the agent 15B sends an acknowledgment of establishment (ack) to the manager 25A (operation S147). A session is consequently established between the agent 15B and the manager 25A. Thus, the registering section 66 of the manager 25A registers the state of use 65C of the session (15B/25A) established between the agent 15B and the manager 25A as being "used" in the management table 65.

Further, the communication section 54 of the agent 15B sends, to the manager 25A, information on session establishment of the destination of the command telnet>open [25A, 30A] separated at the operation S142 (operation S148). The analyzing section 63 of the manager 25A analyzes the information on session establishment corresponding to the destination of the command (operation S149). The deciding section 64 refers to the management table 65 so as to analyze a session established between the manager 25A and the router 30A corresponding to the destination of the command.

The deciding section 64 identifies an established session being in an "unused" state of use corresponding to the destination of the command (operation S150). Then, the sessions are established between the agent 15B and the router 30A via the manager 25A. Thus, the registering section 66 of the manager 25A registers the state of use 65C of the session (25A/30A) established between the manager 25A and the router 30A as being "used" in the management table 65.

If an established "unused" session is identified, the relay section 62 sends, to the agent 15B, a reply of successful establishment indicating that the sessions are successfully established between the agent 15B and the router 30A (operation S151). Further, upon receiving the reply of successful establishment, the communication section 54 of the agent 15B sends a data transmission (push) frame corresponding to the command to the manager 25A by using the established new session (15B/25A) (operation S152).

Further, the relay section 62 of the manager 25A relays the data transmission (push) frame coming from the agent 15B to the router 30A by using the established "unused" session (25A/30A) (operation S153). As a result, upon receiving the data transmission (push) frame, the router 30A carries out what is commanded corresponding to the data transmission (push) and obtains a resultant reply to the command.

Then, the router 30A sends a reply to data transmission (push+ack), i.e., the resultant reply to what is commanded to the manager 25A by using the established session (operation S154). The relay section 62 of the manager 25A relays the reply to data transmission (push+ack) to the agent 15B (operation S155). The agent 15B consequently operates the router 30A by remote control by using the established session via the manager 25A.

Upon relaying the reply to data transmission (push+ack) coming from the router 30A to the agent 15B, the control section 69 in the manager 25A identifies the state of use of the established sessions (15A/25A, 25A/30A) before being repeatedly used as being "unused" (operation S156). Then, the registering section 66 in the manager 25A updates the state of use 65C of the established sessions before being repeatedly used as being "unused" in the management table 65 (operation S157). The communication section 61 sends a frame indicating the update of the management table 65 to the agents 15A and 15B (operation S158). The agent 15A is consequently aware that the state of use of the established sessions is updated as being "unused", and so the agent 15B. Incidentally, the registering section 66 may update the state of use of the established sessions (15B/25A, 25A/30A) after being used instead of updating the state of use of the established sessions before being repeatedly used at the operation S157.

As depicted in FIG. 11, e.g., data transmission and reply to data transmission related to a command of another client are carried out by the use of a new session between the agent 15B and the manager 25A and an established "unused" session between the manager 25A and the router 30A.

Figure 12:
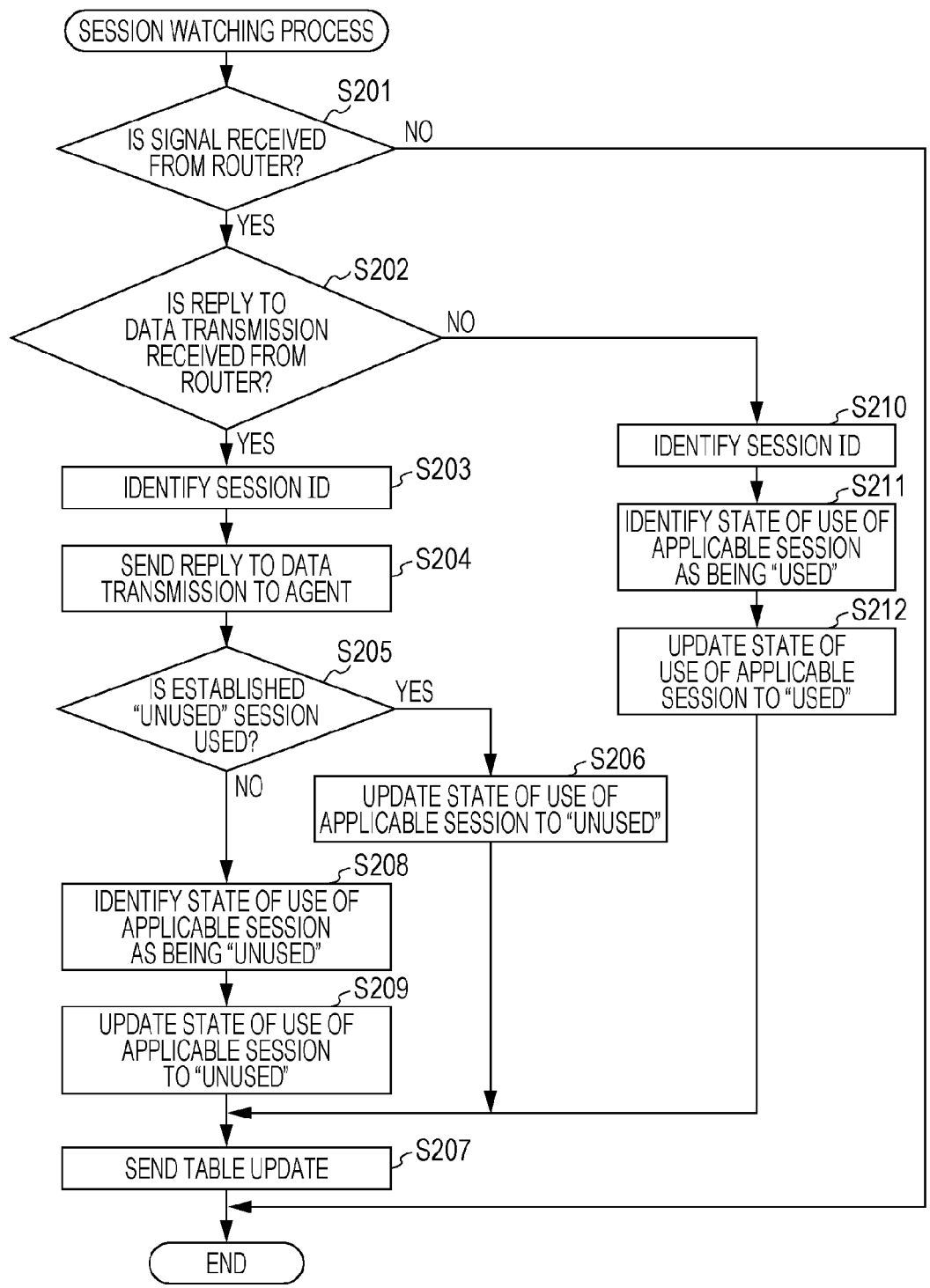
FIG. 12 is a flowchart which depicts an exemplary data processing operation of the manager related to a session watching process.

FIG. 12 is a flowchart which depicts an exemplary data processing operation of the manager 25 related to a session watching process. According to the session watching process depicted in FIG. 12, watch the state of use of the sessions established between the agent 15 and the manager 25 and between the manager 25 and the router 30, and update the state of use of every established session in the management table 65. The relay section 62 of the manager 25 decides whether a signal is received from the router 30 as depicted in FIG. 12 (operation S201).

Upon receiving a signal from the router 30 (operation S201 positive), the control section 69 decides whether a reply to data transmission (push+ack) is received from the router 30 (operation S202). Upon receiving a reply to data transmission (push+ack) from the router 30 (operation S202 positive), the control section 69 identifies a session ID of a session used for receiving the reply to data transmission (push+ack) (operation S203).

After the session ID is identified, the relay section 62 sends the reply to data transmission (push+ack) received from the router 30 to the agent 15 (operation S204). The control section 69 decides whether an established "unused" session is used for sending the reply to data transmission (push+ack) (operation S205). If an established "unused" session is used (operation S205 positive), the registering section 66 updates the state of use 65C of the applicable session as being "unused" in the management table 65 (operation S206). Further, the control section 69 notifies the agent 15 connected with the applicable manager 25 of the update in the management table 65 (operation S207), and ends the data processing operation depicted in FIG. 12.

Further, unless an established "unused" session is used (operation S205 negative), the control section 69 identifies the established session used for the reply to data transmission (push+ack) as being "unused" (operation S208). Further, the registering section 66 updates the state of use 65C of the established session as being "unused" in the management table 65 (operation S209), and shifts to the operation S207 so as to report the update of the table.

Further, if no signal is received from the router 30 (operation S201 negative), the relay section 62 ends the data processing operation. Further, if no reply to data transmission (push+ack) is received from the router 30 (operation S202 negative), the control section 69 identifies a session ID of the established session (operation S210). Upon identifying the session ID of the established session, the control section 69 identifies the state of use of the session corresponding to the session ID as being "used" (operation S211). Further, the registering section 66 registers the state of use 65C of the session ID 65A as being "used" in the management table 65 (operation S212) and shifts to the operation S207 so as to report the update of the table.

In the session watching process depicted in FIG. 12, receive a reply to data transmission (push+ack) corresponding to the command from the router 30 and relay the reply to data transmission (push+ack) to the agent 15 that the command is issued to. Further, if the command is relayed by the use of an established "unused" session in the session watching process, update the state of use 65C of the applicable session as being "unused" in the management table 65. The management table 65 consequently manages the established "unused" session.

In the session watching process, receive a reply to data transmission (push+ack) corresponding to the command from the router 30 and relay the reply to data transmission (push+ack) to the agent 15 that the command is issued to. Further, upon relaying the data transmission frame and the reply to data transmission by using a new session in the session watching process, update the state of use 65C of the applicable session as being "unused" in the management table 65. The management table 65 consequently manages the established "unused" session.

Further, upon receiving a signal except for the reply to data transmission by using an established session in the session watching process, update the state of use 65C of the established session as being "used" in the management table 65. The management table 65 consequently manages the established "used" session.

Figure 13:
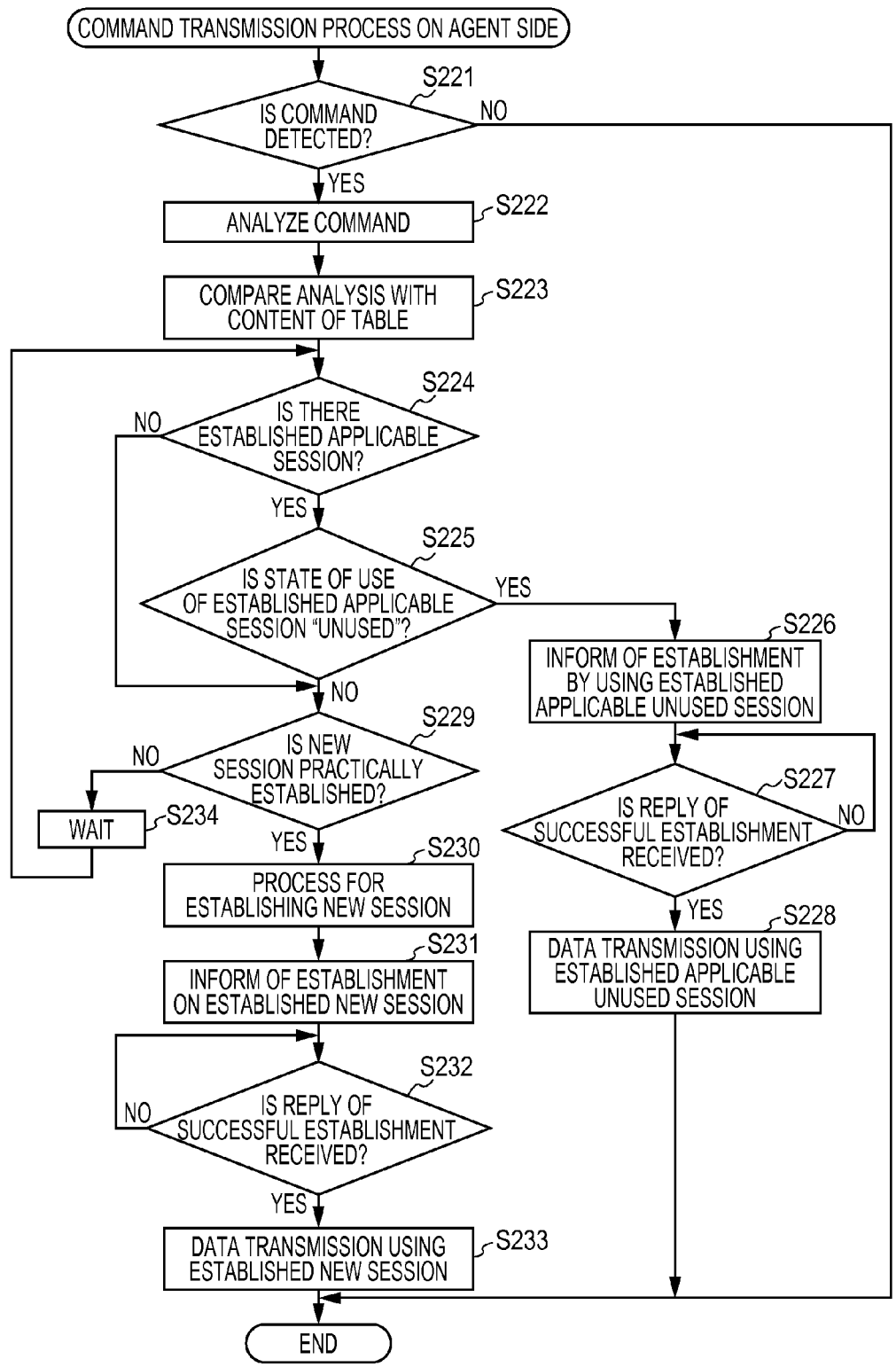
FIG. 13 is a flowchart which depicts an exemplary data processing operation of the agent related to a command transmission process on the agent side.

FIG. 13 is a flowchart which depicts an exemplary data processing operation of the agent 15 related to a command transmission process on the agent side. Send a data transmission (push) frame according to a command issued by the telnet running section 14 to the router 30 from the agent 15 to the manager 25 in the command transmission process on the agent side depicted in FIG. 13. The detecting section 51 of the agent 15 decides whether a command issued by the telnet running section 14 is detected as depicted in FIG. 13 (operation S221). If a command is detected (operation S221 positive), the analyzing section 52 analyzes what is commanded (operation S222). The deciding section 53 compares a resultant analysis of the command and content of the management table 65 (operation S223), and decides whether an established session corresponding to the destination of the command is in the management table 65 (operation S224).

If an established session corresponding to the destination of the command is in the management table 65 (operation S224 positive), the deciding section 53 refers to the management table 65 and decides whether the established session is in an "unused" state of use (operation S225). If the established session is in an "unused" state of use (operation S225 positive), the communication section 54 sends information on session establishment on the destination of the command to the manager 25 by using the established "unused" session (operation S226). Further, the communication section 54 decides whether a reply of successful establishment is received from the manager 25 (operation S227). Upon receiving a reply of successful establishment (operation S227 positive), the communication section 54 carries out data transmission (push) corresponding to the command by using the established "unused" session (operation S228), and ends the data processing operation depicted in FIG. 13.

Further, unless the established session is in an "unused" state of use (operation S225 negative), the deciding section 53 decides whether the relay system 1 is under the conditions that a new session is established (operation S229). If the relay system 1 is under the conditions that a new session is established (operation S229 positive), the communication section 54 runs a process for establishing a new session (operation S230). Further, after running the process for establishing a new session, the communication section 54 sends information on session establishment on the destination of the command by using the new session (operation S231). Further, the communication section 54 decides whether a reply of successful establishment is received from the manager 25 (operation S232). Upon receiving a reply of successful establishment (operation S232 positive), the communication section 54 carries out data transmission (push) corresponding to the command by using the established new session (operation S233), and ends the data processing operation depicted in FIG. 13.

If no command is detected (operation S221 negative), the detecting section ends the data processing operation depicted in FIG. 13. Further, if no established session corresponding to the destination of the command is in the management table 65 (operation S224 negative), the deciding section 53 shifts to the operation S229 so as to decide whether the relay system 1 is under the conditions that a new session is established. Further, unless the relay system 1 is under the conditions that a new session is established (operation S229 negative), the communication section 54 waits (operation S234) and shifts to the operation S224 so as to decide whether an established applicable session is in the management table 65. Further, if no reply of successful establishment is received (operation S227 negative), the communication section 54 shifts to the operation S227 so as to watch whether a reply of successful establishment is received. Further, if no reply of successful establishment is received (operation S232 negative), the communication section 54 shifts to the operation S232 so as to watch whether a reply of successful establishment is received.

Upon detecting a command, decide whether an established session corresponding to the destination of the command is "unused" in the command transmission process on the agent side depicted in FIG. 13. Further, if an established session corresponding to the destination of the command is "unused", relay the commanded data transmission (push) to the manager 25 by using the established "unused" session corresponding to the destination of the command in the command transmission process on the agent side. As a result, the agent 15 relays the commanded data transmission (push) to the manager 25 by using the established "unused" session without establishing a new session.

If no established session corresponding to the destination of the command is "unused" under the conditions that a new session is established, establish a new session in the command transmission process on the agent side. Then, relay commanded data transmission (push) to the manager 25 by using the established new session in the command transmission process on the agent side. Without an established "unused" session, the agent 15 is consequently establish a new session under the conditions that a new session is established and relay the commanded data transmission (push) to the manager 25 by using the new session.

If no established session corresponding to the destination of the command is "unused" under the conditions that no new session is established, wait until a session to be used for commanded data transmission (push) turns to be "unused" in the command transmission process on the agent side.

Figure 14:
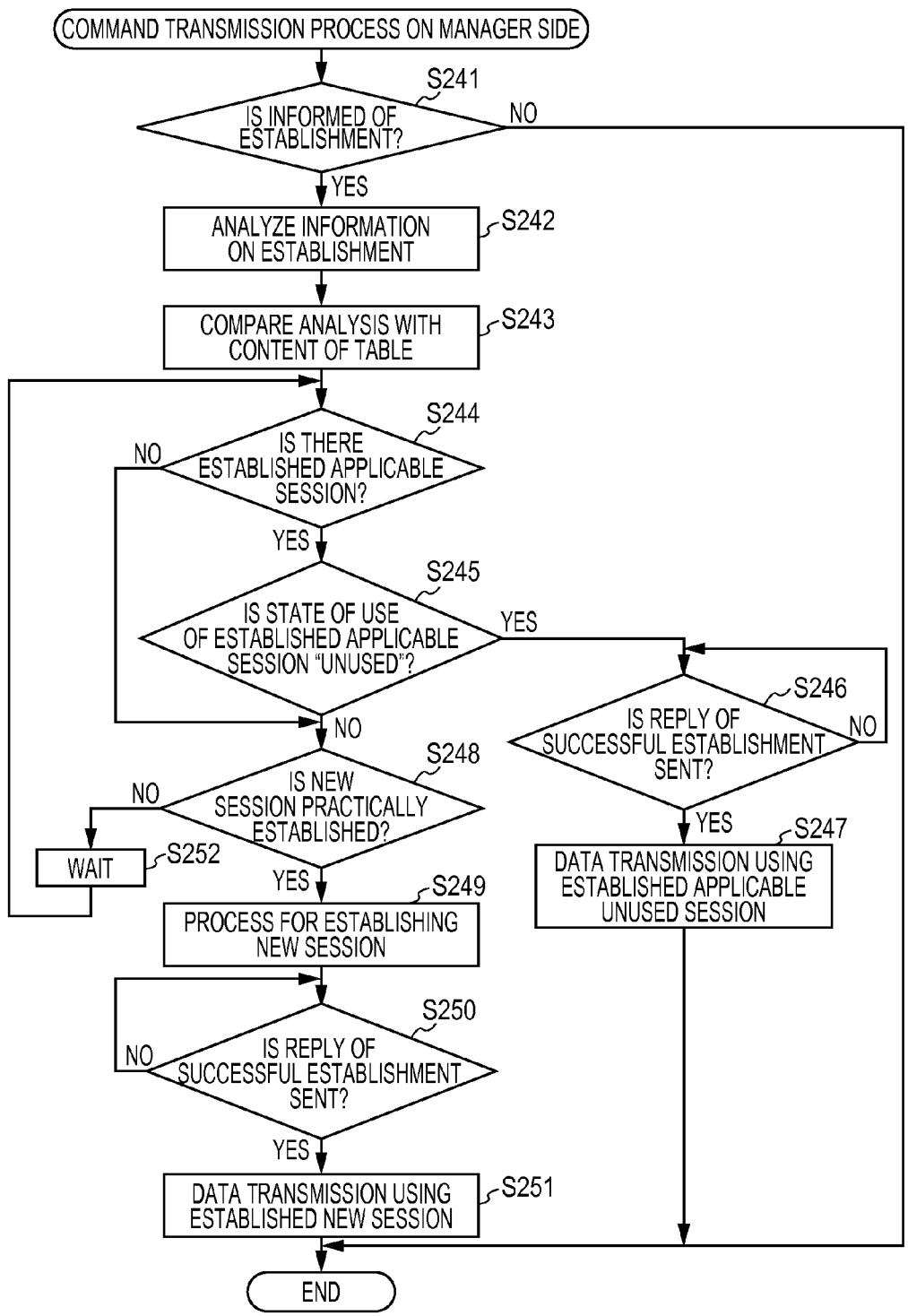
FIG. 14 is a flowchart which depicts an exemplary data processing operation of the manager related to a command transmission process on the manager side.

FIG. 14 is a flowchart which depicts an exemplary data processing operation of the manager 25 related to a command transmission process on the manager side. Relay a command received from the agent 15 to the router 30 in the command transmission process on the manager side depicted in FIG. 14. The analyzing section 63 of the manager 25 decides whether information on session establishment is received from the agent 15 (operation S241) as depicted in FIG. 14. Upon receiving information on session establishment (operation S241 positive), the analyzing section 63 analyzes the information on session establishment (operation S242). The deciding section 64 compares a resultant analysis of the information on session establishment with content in the management table 65 (operation S243) and decides whether an established session corresponding to the information on session establishment of the destination of the command is in the management table 65 (operation S244).

If an established session corresponding to the information on session establishment is in the management table 65 (operation S244 positive), the deciding section 64 refers to the management table 65 and decides whether the established session is in an "unused" state of use (operation S245). If the state of use of the established session is "unused" (operation S245 positive), the relay section 62 decides whether a reply of successful establishment is sent to the agent 15 by the use of the established "unused" session (operation S246). If a reply of successful establishment is sent to the agent 15 (operation S246 positive), the relay section 62 carries out commanded data transmission by using the established "unused" session (operation S247) and ends the data processing operation depicted in FIG. 14.

Further, if no established session is in an "unused" state of use (operation S245 negative), the deciding section 64 decides whether the relay system 1 is under the conditions that a new session is established (operation S248). If the relay system 1 is under the conditions that a new session is established (operation S248 positive), the relay section 62 carries out a process for establishing a new session (operation S249). Upon carrying out the process for establishing a new session, the relay section 62 decides whether a reply of successful establishment is sent to the agent 15 (operation S250). Further, if a reply of successful establishment is sent to the agent 15 (operation S250 positive), the relay section 62 carries out commanded data transmission (push) by using the new session (operation S251) and ends the data processing operation depicted in FIG. 14.

Further, unless information on session establishment is received from the agent 15 (operation S241 negative), the analyzing section 63 ends the data processing operation depicted in FIG. 14. Further, if no session corresponding to the information on session establishment of the destination of the command is established (operation S244 negative), the deciding section 64 shifts to the operation S248 so as to decide whether the relay system 1 is under the conditions that a new session is established. Further, unless the relay system 1 is under the conditions that a new session is established (operation S248 negative), the relay section 62 waits (operation S252) and shifts to the operation S244 so as to decide whether an applicable session is established.

Further, if no reply of successful establishment is sent (operation S246 negative), the relay section 62 shifts to the operation S246 so as to watch whether a reply of successful establishment is sent. Further, if no reply of successful establishment is sent (operation S250 negative), the relay section 62 shifts to the operation S250 so as to watch whether a reply of successful establishment is sent.

Upon detecting information on session establishment, decide whether an established session corresponding to the destination of the command is "unused" in the command transmission process on the manager side depicted in FIG. 14. Further, if an established session corresponding to the destination of the command is "unused" in the command transmission process on the manager side, relay the commanded data transmission (push) to the router 30 by using the established "unused" session. The manager 25 consequently relays the commanded data transmission (push) to the router 30 by using the established "unused" session without establishing a new session.

Under the conditions that no established session corresponding to the destination of the command is "unused" and a new session is established in the command transmission process on the manager side, establish a new session and relay commanded data transmission (push) to the router 30. The manager 25 consequently establishes a new session and relay the commanded data transmission (push) to the router 30 under the conditions that a new session is established even without an established "unused" session.

Under the conditions that no established session corresponding to the destination of the command is "unused" and it is impractical to establish a new session in the command transmission process on the manager side, wait until a session to be used for data transmission (push) turns to be unused.

Figure 15:
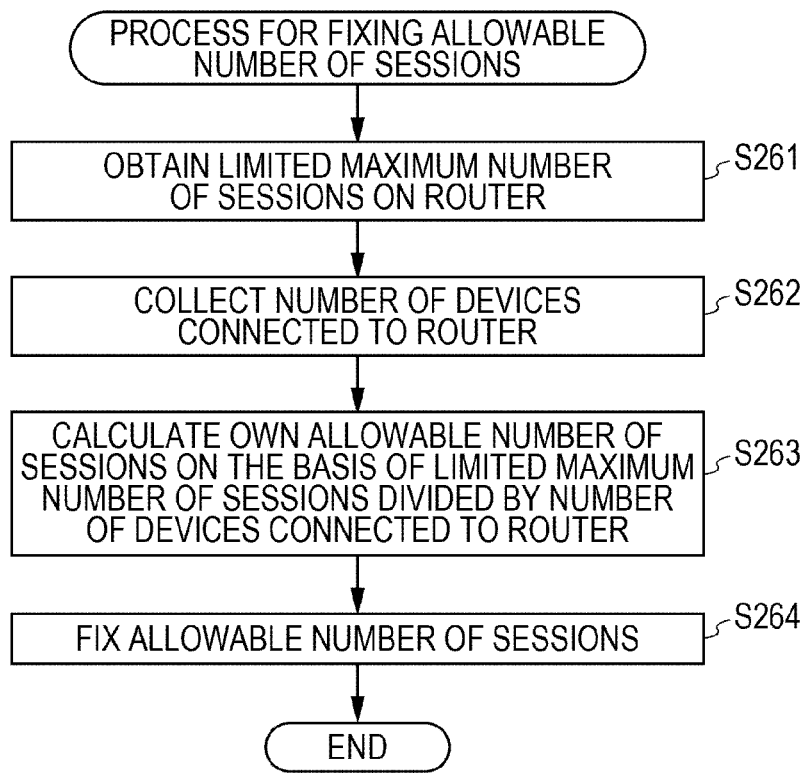
FIG. 15 is a flowchart which depicts an exemplary data processing operation of the manager related to a process for fixing an allowable number of sessions.

FIG. 15 is a flowchart which depicts an exemplary data processing operation of the manager 25 related to a process for fixing an allowable number of sessions. According to the process for fixing an allowable number of sessions depicted in FIG. 15, the manager 25 autonomously fixes an allowable number of sessions that the manager 25 establishes by itself. The communication section 61 of the manager 25 communicates with the router 30 and obtains a limited maximum number of sessions that the router 30 establishes by itself (operation S261) as depicted in FIG. 15. The communication section 61 contacts the relay servers 20 and the connection start terminals 10 connected with the router 30 in broadcast communication. The communication section 61 knows how many devices are connected with the router 30 on the basis of the number of replies to the broadcast communication (operation S262). The fixing section 67 calculates the allowable number of sessions on the basis of the obtained limited maximum number of sessions and the number of the connected devices by using an equation, i.e., (the limited maximum number of sessions/the number of the connected devices) (operation S263). The fixing section 67 fixes the calculated allowable number of sessions as its limited maximum number of sessions (operation S264), and ends the data processing operation depicted in FIG. 15.

According to the process for fixing the allowable number of sessions depicted in FIG. 15, collect the limited maximum number of sessions of the router 30 and the number of devices connected with the router 30 and autonomously fix the allowable number of sessions. The relay servers 20 each autonomously fix their own allowable number of sessions.

Figure 16:
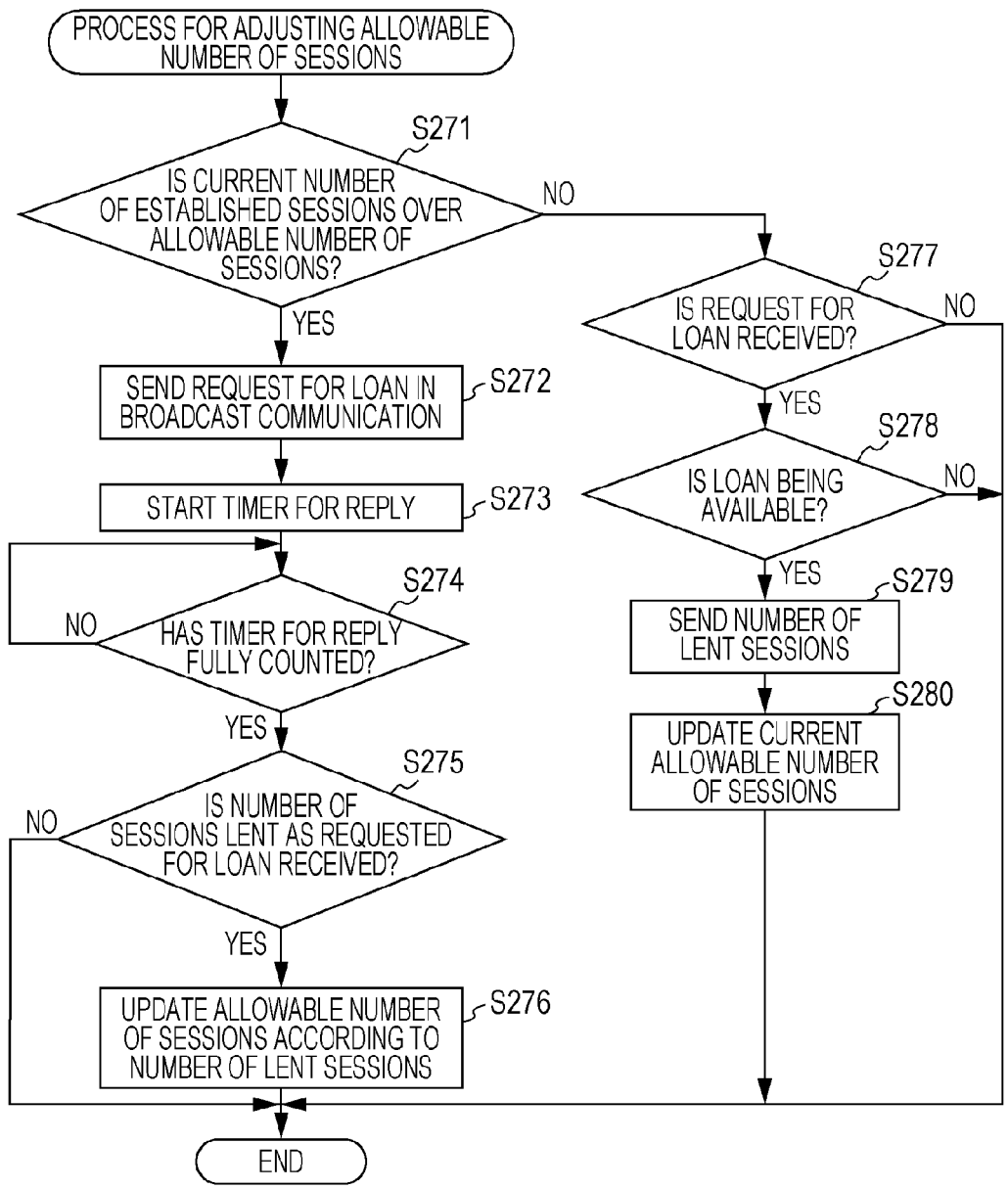
FIG. 16 is a flowchart which depicts an exemplary data processing operation of the manager related to a process for adjusting the allowable number of sessions.

FIG. 16 is a flowchart which depicts an exemplary data processing operation of the manager 25 related to a process for adjusting the allowable number of sessions. According to the process for adjusting the allowable number of sessions depicted in FIG. 16, the managers 25 of the relay servers 20 communicate with one another and each fix their own allowable number of sessions accordingly. The lending section 68 of the manager 25 decides whether the current number of established sessions is over the allowable number of sessions as depicted in FIG. 16 (operation S271).

If the current number of established sessions is over the allowable number of sessions (operation S271 positive), the lending section 68 sends a request for loan to each of the relay servers 20 directly connected with the router 30 in broadcast communication (operation S272). Incidentally, if a session not established yet is lent within the allowable number of sessions in response to the request for loan, the lending section 68 in the manager 25 of each of the relay servers 20 sends the number of lent sessions back to the relay server 20 having issued the request for loan.

After sending the request for loan in broadcast communication, the lending section 68 starts a timer for reply (operation S273). The lending section 68 decides whether the timer for reply has fully counted (operation S274). If the timer for reply has fully counted (operation S274 positive), the lending section 68 decides whether the number of lent sessions is received in response to the request for loan (operation S275). If the number of lent sessions is received in response to the request for loan (operation S275 positive), the fixing section 67 updates the current allowable number of sessions according to the received number of lent sessions (operation S276), and ends the data processing operation depicted in FIG. 16. If, e.g., the allowable number of sessions and the number of lent sessions are five and two, respectively, the allowable number of sessions of the fixing section 67 is seven. The relay server 20 can consequently borrow an unused session not established yet from a different relay server 20 even if the number of established sessions is over the allowable number of sessions "five".

Further, unless the number of lent sessions is received in response to the request for loan (operation S275 negative), the lending section 68 ends the data processing operation depicted in FIG. 16. Unless the current number of established sessions is over the allowable number of sessions (operation S271 negative), the lending section 68 decides whether a request for loan is received from a different relay server 20 (operation S277). If a request for loan is received from a different relay server 20 (operation S277 positive), the lending section 68 decides whether the relay server 20 is currently under the conditions that a session is lent (operation S278). If the relay server 20 is currently under the conditions that a session is lent (operation S278 positive), the lending section 68 sends the number of lent sessions to the relay server 20 having issued the request for loan in response to the request for loan (operation S279).

If the number of lent sessions is sent to the relay server 20 having issued the request for loan, the fixing section 67 updates the current allowable number of sessions according to the number of lent sessions (operation S280), and ends the data processing operation depicted in FIG. 16. That is, if the allowable number of sessions and the number of sessions to be lent to a different relay server 20 are five and one, respectively, the allowable number of sessions of the fixing section 67 is four.

According to the process for adjusting the allowable number of sessions depicted in FIG. 16, the managers 25 communicate with one another and mutually borrow and lend the allowable number of sessions so that the allowable number of sessions set by each of the managers 25 is adjusted.

If a session established between the agent 15 and the manager 25 of the relay system 1 of the first embodiment remains unused, carry out data transmission commanded by another application and reply to the data transmission by using the unused session. Further, if a session established between the manager 25 and the router 30 of the relay system 1 remains unused, carry out data transmission commanded by another application and reply to the data transmission by using the unused session. As a result, the connection start terminal 10, the relay server 20 and the router 30 repeatedly use the established unused session for data transmission commanded by another application and reply to the data transmission, so as to omit a process for establishing a new session and reduce their data processing workloads.

As the agent 15 sends a heartbeat message to the router 30 via the manager 25 in the relay system 1 of the first embodiment at particular time, the sessions established between the agent 15 and the router 30 are continuously maintained. That is, the sessions established between the agent 15 and the manager 25 and between the manager 25 and the router 30 are continuously maintained.

If the manager 25 of the first embodiment receives a reply to commanded data transmission by using an established session and relays the reply of the data transmission to the agent 15, the manager 25 registers the state of use 65C of the established session as being "unused" in the management table 65. The agent 15 and the manager 25 are consequently aware of the state of use of the established session with reference to the content of the management table 65.

The relay server 20 of the first embodiment collects data of the limited maximum number of sessions which is established on the side of the router 30 and the number of relay servers 20 connected with the router 30 in a manner of enabling session establishment. Further, the relay server 20 calculates the allowable number of sessions, i.e., how many sessions the relay server 20 allows to be established by itself on the basis of the limited maximum number of sessions and the number of connected relay servers 20. As a result, the relay server 20 autonomously calculates the allowable number of sessions and allows sessions to be established within the allowable number of sessions.

Upon detecting a request for loan coming from a different relay server 20 connected with the router 30 in a manner of enabling session establishment, the relay server 20 of the first embodiment decides whether a session not yet established remains within the allowable number of sessions of the relay server 20 itself. If a session not yet established remains, the relay server 20 lends the session not yet established to the different relay server 20. Further, upon detecting sessions not yet established and lent by a different relay server 20, the relay server 20 decides the allowable number of sessions of the relay server 20 itself according to the number of the lent sessions. The relay server 20 consequently adjusts the allowable number of sessions by borrowing and lending sessions not yet established from and to the different relay server 20.

Incidentally, the relay server 20 of the above first embodiment relays commanded data transmission and a resultant reply between the connection start terminal 10 and the router 30 by using an established session. Instead, the relay system 1 may work as explained below as a second embodiment.

Second Embodiment

Figure 17:
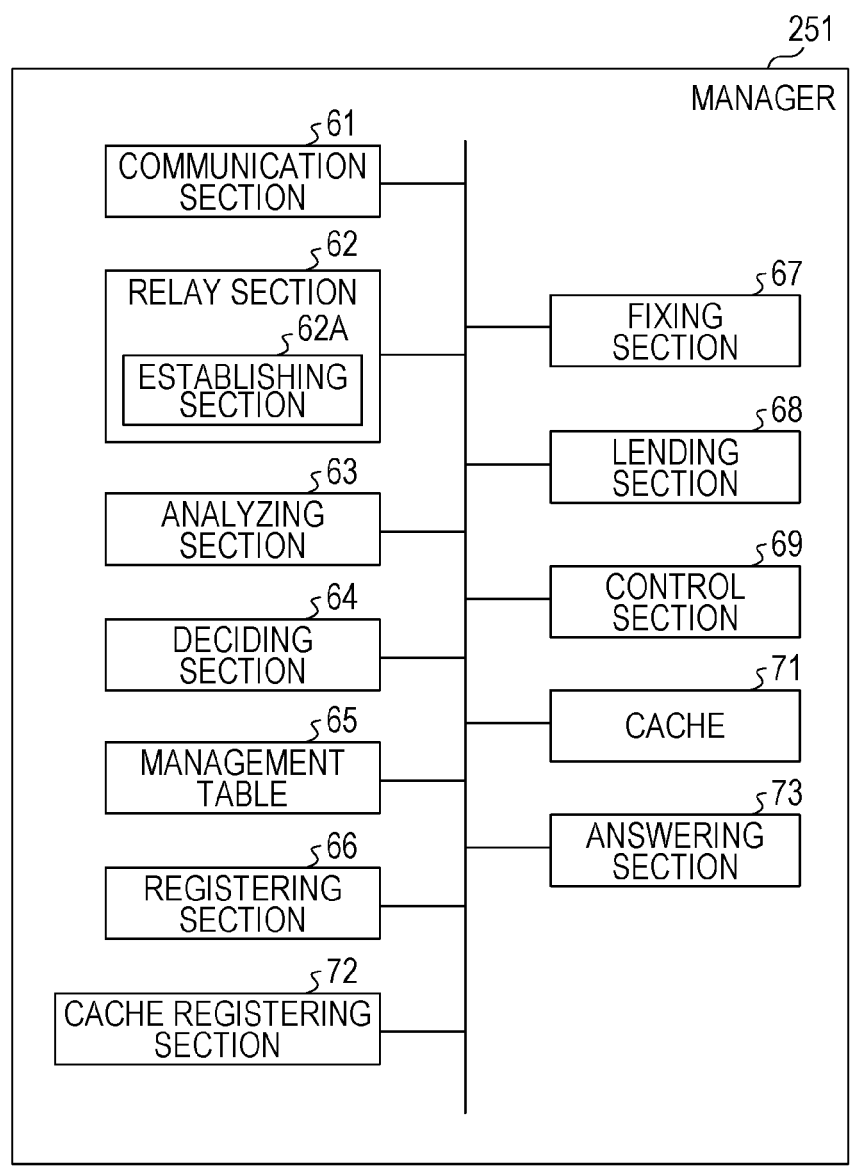
FIG. 17 is an explanatory diagram which depicts exemplary functions of a manager related to a relay system of a second embodiment.

FIG. 17 is an explanatory diagram which depicts exemplary functions of a manager related to a relay system of the second embodiment. Incidentally, a portion which is a same as the corresponding one of the relay system 1 of the first embodiment is given a same reference numeral, and a repeated explanation of the portion and its operation will be omitted. FIG. 17 depicts a manager 251 having the communication section 61, the relay section 62, the establishing section 62A, the analyzing section 63, the deciding section 64, the management table 65, the registering section 66, the fixing section 67, the lending section 68 and the control section 69. The manager 251 further has a cache 71, a cache registering section 72 and an answering section 73.

Upon receiving a resultant reply corresponding to commanded data transmission via the relay section 62, the cache registering section 72 registers content of the commanded data transmission and the resultant reply corresponding to the content of the data transmission in the cache 71. Further, e.g., one minute after registering the content of the commanded data transmission and the resultant reply in the cache 71, the cache registering section 72 erases the content of the commanded data transmission and the resultant reply having been registered from the cache 71. Incidentally, the content of the data transmission and the resultant reply registered in the cache 71 is limited, e.g., to content of data transmission whose resultant reply is impossibly changed in one minute and its resultant reply.

Further, upon detecting commanded data transmission carried out by the agent 15 by the use of an established session, the answering section 73 decides whether the content of the data transmission is registered in the cache 71. If the content of the data transmission is registered in the cache 71, the answering section 73 reads a resultant reply corresponding to the content of the data transmission from the cache 71. If the content of the data transmission is registered in the cache 71, the answering section 73 does not relay the data transmission to the router 30 and sends a resultant reply corresponding to the content of the data transmission registered in the cache 71 back to the agent 15.

Figure 18:
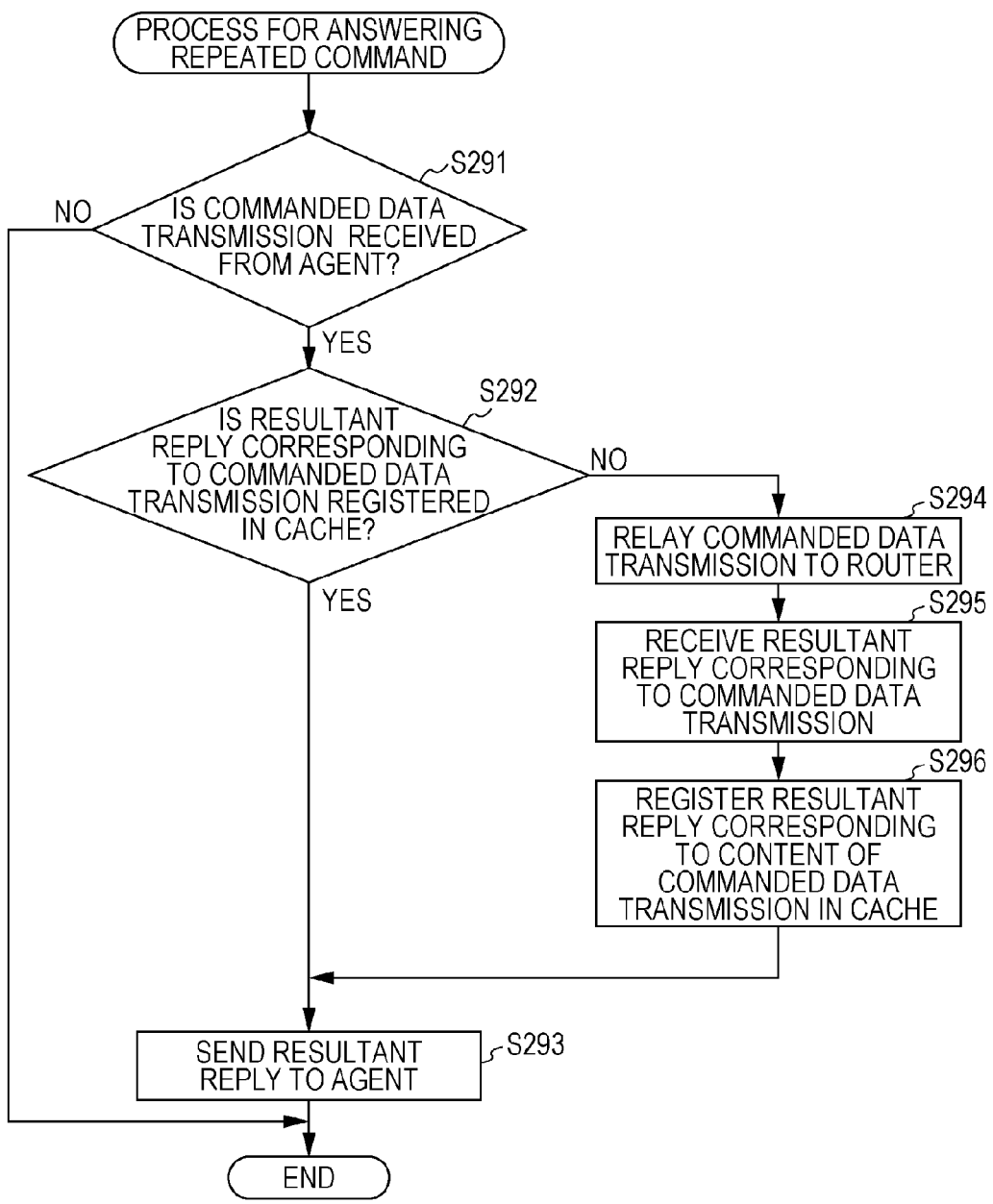
FIG. 18 is a flowchart which depicts an exemplary operation of a manager related to a process for answering a repeated command.

Then, how the relay system 1 of the second embodiment works will be explained. FIG. 18 is a flowchart which depicts an exemplary operation of the manager 251 related to a process for answering a repeated command. According to the process depicted in FIG. 18 for answering a repeated command, upon obtaining a resultant reply corresponding to commanded data transmission from the router 30, register content of the data transmission and the resultant reply connected with each other in the cache 71. According to the process for answering a repeated command, further, upon detecting a frame of identical and repeated data transmission, read the resultant reply corresponding to the data transmission from the cache 71 and answer the agent 15 the resultant reply having been read without relaying the data transmission to the router 30.

The answering section 73 of the manager 251 decides whether a frame of commanded data transmission is received from the agent 15 (operation S291) as depicted in FIG. 18. If a frame of data transmission is received from the agent 15 (operation S291 positive), the answering section 73 decides whether a resultant reply corresponding to the content of the data transmission is registered in the cache 71 (operation S292). If a resultant reply is registered in the cache 71 (operation S292 positive), answer the agent 15 the resultant reply corresponding to the commanded data transmission without relaying the commanded data transmission to the router 30 (operation S293). Then, the manager 251 ends the data processing operation depicted in FIG. 18.

If no frame of data transmission is received from the agent 15 (operation S291 negative), the answering section 73 ends the data processing operation depicted in FIG. 18. Further, if no resultant reply corresponding to the content of the commanded data transmission is in the cache 71 (operation S292 negative), the answering section 73 relays the applicable commanded data transmission to the router 30 (operation S294). Further, upon receiving a resultant reply corresponding to the commanded data transmission via the relay section 62 (operation S295), the cache registering section 72 registers the content of the commanded data transmission and the resultant reply connected with each other in the cache 71 (operation S296). Further, the relay section 62 shifts to the operation S293 so as to send the resultant reply corresponding to the content of the commanded data transmission to the agent 15. Incidentally, upon registering the content of the commanded data transmission and the resultant reply connected with each other in the cache 71, the cache registering section 72 starts, e.g., a one-minute timer. Further, if the one-minute timer has fully counted, the cache registering section 72 erases the content of the commanded data transmission and the resultant reply having been registered from the cache 71.

Upon receiving a resultant reply corresponding to commanded data transmission from the router 30 in the process for answering a repeated command depicted in FIG. 18, register content of the commanded data transmission and the resultant reply connected with each other in the cache 71. Further, upon detecting commanded data transmission carried out by the agent 15 in a case where content of the data transmission, i.e., content of the command has been registered in the cache 71, read a resultant reply corresponding to the content of the data transmission from the cache 71 and answer the resultant reply to the agent 15. As a result, the agent 15 significantly shortens time to wait for a resultant reply to a repeated command, i.e. content of identical data transmission.

Then the router 30 being the connection end device is accessed less frequently, and the connection end device reduces its workload.

Upon receiving a resultant reply to commanded data transmission from the router 30, the manager 251 of the second embodiment registers content of the data transmission and the resultant reply connected with each other in the cache 71. Further, upon receiving data transmission in a case where a resultant reply to content of the data transmission has been registered in the cache 71, the manager 251 sends the resultant reply having been registered in the cache 71 back to the agent 15 without relaying the data transmission to the router 30. As a result, the agent 15 significantly shortens time to wait for a resultant reply to a repeated command, i.e. content of identical data transmission.

A device to be given a command is, although exemplified by the router 30 according to the embodiments 1 and 2, not limited to a router and is applied to a communication device such as a network device such as a layer 2 switch.

Further, the command to be run by the telnet running section 14 of the above embodiment 1 or 2 is not limited to a telnet command. The command to be run by the telnet running section 14 may be of an application program for communicating with another computer on the network 5, e.g., rsh (remote shell), rlogon (remote login), SSH (Secure Shell), etc. Further, the application program for communicating with another computer on the network 5 is not limited to those listed above and may be any application program that a session is desirable to be established for.

Further, although being arranged in the manager 25 according to the embodiment 1 or 2, the management table 65 may be managed by a memory device externally connected with the relay server 20. Further, not only the manager 25 but the connection start terminal 10 may similarly have the management table 65. Further, the agent 15 and the manager 25 are implemented as software functions to be run by the CPU 13 in the connection start terminal 10 and the CPU 23 in the relay server 20, respectively, according to the embodiments 1 and 2. Functional sections may be provided, however, as hardware components which implement the respective functions.

Upon receiving a reply of successful establishment from the manager 25 after a session is established between the manager 25 and the router 30, the agent 15 sends a commanded data transmission (push) frame to the manager 25 by using the established session according to the embodiments 1 and 2. After a session is established between the agent 15 and the manager 25, however, the agent 15 sends a commanded data transmission (push) frame to the manager 25 by using the established session. Then, upon receiving the data transmission (push) frame from the agent 15, the manager 25 temporarily keeps the data transmission (push) frame. Then, upon detecting a session established with the router 30, the manager 25 may send the temporarily kept data transmission (push) frame to the router 30.

Further, the depicted components of the respective portions may be physically constituted not so exactly as depicted in the drawings. The respective portions may be specifically separated from or integrated with one another in a manner not limited to the depicted one. All or part of any segmentations of the portions may be constituted by being functionally or physically separated from or integrated with one another according to various conditions of loads and use.

All or any part of the various data processing functions to be implemented by the respective devices may be run by a CPU (Central Processing Unit) (or a microcomputer such as an MPU (Micro Processing Unit), an MCU (Micro Controller Unit), etc.). Further, it is obvious that all or any part of the various data processing functions may be implemented on a program to be analytically run by the CPU (or microcomputer such as MPU, MCU, etc.) or by wired-logic hardware.

Incidentally, the various kinds of data processing explained as to the embodiments 1 and 2 are implemented by a prepared program being run by a computer. Thus, an exemplary computer which runs a program having same functions as those of the above embodiments will be explained by the use of FIG. 19, in which a computer for running a communication program is illustrates.

Figure 19:
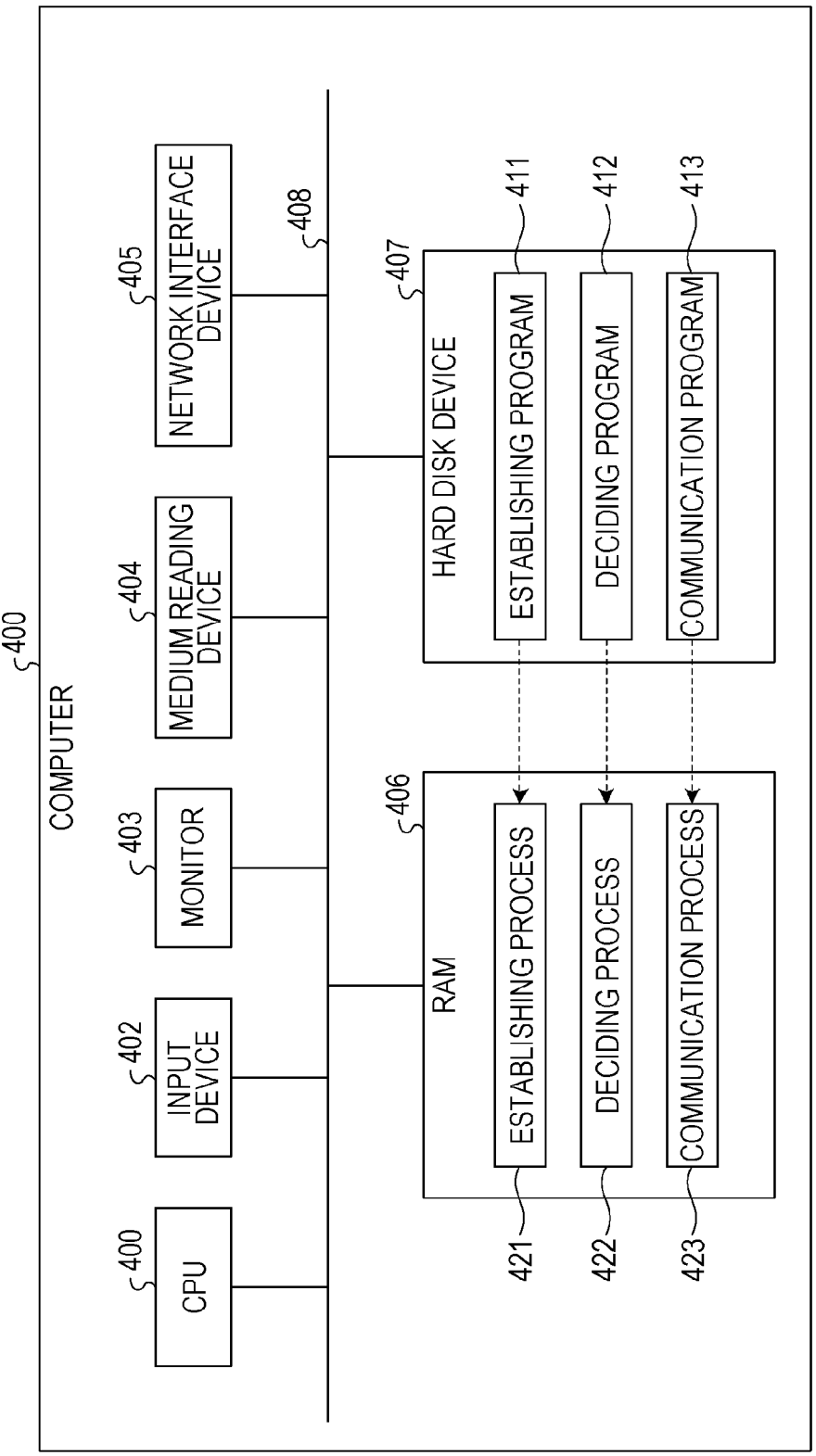
FIG. 19 illustrates a computer which runs a communication program.

The computer 400 depicted in FIG. 19 has a CPU 401 which runs various kinds of arithmetic operations, an input device 402 which accepts data input from a user, and a monitor 403 which displays various kinds of information. The computer 400 further has a medium reading device 404 which reads a program, etc. from a storage medium, and a network interface device 405 which exchanges data with another computer via a network. The computer 400 further has a RAM (Random Access Memory) 406 in which various kinds of information are temporarily stored and a hard disk device 407. The respective devices 401-407 are each connected to a bus 408.

Then, a communication program which functionally work similarly as the above embodiments is stored in the hard disk device 407 in advance. The communication program includes an establishing program 411, a deciding program 412 and a communication program 413 as depicted in FIG. 19. Incidentally, the programs 411-413 may be suitably integrated with or separated from one another similarly as the respective components of the manager 25 depicted in FIG. 3. Further, data of a state of use of an established session is stored in the hard disk device 407.

The CPU 401 reads the establishing program 411, the deciding program 412 and the communication program 413 from the hard disk device 407 and develops those programs on the RAM 406 so as to run those programs. The respective programs consequently work as an establishing process 421, a deciding process 422 and a communication process 423 as depicted in FIG. 19. Incidentally, the respective programs 411-413 may be stored in a storage medium such as a CD- ROM, not in the hard disk device 407, from which the computer 400 may read and run the programs. Further, the computer 400 may read and run the respective programs 411-413 stored in another computer connected via a public network, the Internet, a LAN (Local Area Network), a WAN (Wide Area Network), etc.

The CPU 401 establishes a session with a connection end device. Further, the CPU 401 decides whether an established session remains unused for a command issued by a connection start device. Upon identifying an unused session in time of detecting a command from the connection start device, the CPU 401 exchanges the detected command with the connection end device by using the unused session. Further, the CPU 401 sends a continuing message to the connection end device by using the session within a particular period of time that the connection end device has in which the established session is continuously maintained. As a result, the CPU 401 repeatedly uses the unused session established with the connection end device for data transmission commanded by another application and reply to the data transmission, so as to omit establishment of a new session and reduce its data processing workload.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device configured to relay a signal, the communication device comprising:
a processor configured to execute a procedure, the procedure comprising:
establishing sessions with a first device, the sessions being logical connections in communication;
establishing sessions with a second device;
collecting a limited maximum number of sessions established with the second device and a number of second devices connected by using the established sessions;
calculating an allowable number of sessions to be established by the communication device itself, based on the collected limited maximum number of sessions and the number of the second devices;
in a case of detecting a loan request from another communication device, lending the another communication device a session not yet established within the calculated allowable number of sessions;
establishing sessions with the second device within the calculated allowable number of sessions;
deciding whether an unused session remains in the established sessions for a command generated by the first device to be exchanged with the second device, the unused session being a previously established session in which a previous command generated by the first device has been exchanged with the second device;
in a case of identifying that the unused session remains in the established sessions when the command is received,
exchanging the command with the second device by the unused session; and
communicating messages to the second device by the unused session at particular intervals before a timeout period of the second device passes to continuously maintain the unused session with the second device,
wherein a signal is relayed between the first device performing as a connection start terminal and the second device performing as a connection end device.

2. The communication device according to claim 1, the procedure further comprising:
in a case of identifying that no unused session remains in the established sessions when the command is received, exchanging the command with the second device by establishing a new session.

3. The communication device according to claim 1, the procedure further comprising:
in a case of receiving transmission data in response to the command from the second device,
registering data indicating a state of use of the established sessions for the transmission data as being in an unused state in a management table that manages the state of use of the established sessions; and
deciding whether the unused session remains in the established sessions, based on the state of use in the management table.

4. The communication device according to claim 1, the procedure further comprising:
when a request for loan is received from a other communication device connected with the second device in a manner of enabling session establishment, in a case that non-established sessions remain within the calculated allowable number of sessions of the communication device itself,
lending the non-established sessions to the other communication device; and
when the lending of the non-established sessions from the other communication device is detected,
determining the allowable number of sessions of the communication device itself according to the number of the lent non-established sessions.

5. The communication device according claim 1, the procedure further comprising:
when a reply to a data transmission according to the command is received from the second device,
storing data of the reply being associated with content of the data transmission according to the command; and
when a data transmission according to the command is received from the first device by which the command is generated, in a case that the data of the reply associated with the content of the data transmission according to the command is stored,
transferring the stored data of the reply associated with the content of the data transmission according to the command to the first device.

6. A method for communication of a communication device, the method comprising:
establishing sessions with a first device, the sessions being logical connections in communication;
establishing sessions with a second device;
collecting a limited maximum number of sessions established with the second device and a number of second devices connected by using the established sessions;
calculating an allowable number of sessions to be established by the communication device itself, based on the collected limited maximum number of sessions and the number of the second devices;
in a case of detecting a loan request from another communication device, lending the another communication device a session not yet established within the calculated allowable number of sessions;
establishing sessions with the second device within the calculated allowable number of sessions;
deciding whether an unused session remains in the established sessions for a command generated by the first device to be exchanged with the second device, the unused session being a previously established session in which a previous command generated by the first device has been exchanged with the second device;
in a case of identifying that the unused session remains in the established sessions when the command is received,
exchanging the command with the second device by the unused session; and
communicating messages to the second device by the unused session at particular intervals before a timeout period of the second device passes to continuously maintain the unused session with the second device,
wherein a signal is relayed between the first device performing as a connection start terminal and the second device performing as a connection end device.

7. A relay system comprising:
a first device configured to run at least one application program;
a second device configured to carry out a first command issued by a first application program; and
a third device configured to relay commands between the first device and the second device,
wherein the first device includes a first processor configured to execute a first procedure, the first procedure including:
generating the first command issued by the first application program,
deciding whether an unused session, remains in first sessions established between the first device and the third device for a second command issued by a second application program, based on a destination of the second command, the unused session being a previously established session in which a previous command generated by the first application program has been exchanged with the second device,
in a case of identifying that the unused session remains in the first sessions,
exchanging the second command with the second device by the unused session, and
communicating messages to the third device by the unused session remaining in the first sessions at particular intervals before a timeout period of the second device passes to continuously maintain the unused session in the first sessions with the second device,
wherein the third device includes a second processor configured to execute a second procedure, the second procedure including:
receiving a third command in second sessions established between the first device and the third device,
collecting a limited maximum number of sessions established with the second device and a number of second devices connected by using the established second sessions;
calculating an allowable number of sessions to be established by the third device itself, based on the collected limited maximum number of sessions and the number of the second devices;
in a case of detecting a loan request from another third device, lending the another third device a session not yet established within the calculated allowable number of second sessions;
establishing second sessions with the second device within the calculated allowable number of sessions;
deciding whether an unused session remains in the second sessions established between the second device and the third device for the third command based on a destination of the third command,
in a case of identifying that the unused session remains in the second sessions,
exchanging the third command with the second device by the unused session; and
communicating messages to the second device by the unused session remaining in the second sessions at particular intervals before a timeout period of the second device passes to continuously maintain the unused session in the second sessions with the second device,
wherein a signal is relayed between the first device performing as a connection start terminal and the second device performing as a connection end device.

* * * * *